(12) United States Patent
Noh et al.

(10) Patent No.: US 8,699,385 B2
(45) Date of Patent: Apr. 15, 2014

(54) METHOD FOR TRANSMITTING AND RECEIVING SIGNALS USING A TIME DIVISION DUPLEXING FRAME STRUCTURE

(75) Inventors: Min Seok Noh, Anyang-si (KR); Jin Sam Kwak, Anyang-si (KR); Sung Ho Moon, Anyang-si (KR); Yeong Hyeon Kwon, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 40 days.

(21) Appl. No.: 13/143,533

(22) PCT Filed: Jan. 6, 2010

(86) PCT No.: PCT/KR2010/000053
§ 371 (c)(1),
(2), (4) Date: Sep. 26, 2011

(87) PCT Pub. No.: WO2010/079940
PCT Pub. Date: Jul. 15, 2010

(65) Prior Publication Data
US 2012/0002575 A1    Jan. 5, 2012

Related U.S. Application Data

(60) Provisional application No. 61/156,545, filed on Mar. 2, 2009, provisional application No. 61/151,198, filed on Feb. 10, 2009, provisional application No. 61/143,145, filed on Jan. 7, 2009.

(30) Foreign Application Priority Data

Jul. 20, 2009    (KR) .................... 10-2009-0065904

(51) Int. Cl.
*H04J 3/00*    (2006.01)

(52) U.S. Cl.
USPC ........................................ 370/280

(58) Field of Classification Search
USPC ......... 370/210, 280, 281, 294, 312, 315, 328, 370/329, 345, 474, 330, 344, 350; 375/267, 375/295; 455/110, 522, 450, 561
See application file for complete search history.

(56) References Cited

U.S. PATENT DOCUMENTS 8,446,871 B2 *   5/2013   Lee et al. ..................... 370/329
(Continued)

FOREIGN PATENT DOCUMENTS

CN    1863006    11/2006
CN    101151818    3/2008

OTHER PUBLICATIONS

Nortel, et al., "FDD and H-FDD frame structure for TTR RS and MR-BS," IEEE 802.16 Broadband Wireless Access Working Group, IEEE C802.16j-08/157r5, Nov. 2008, 5 pages.
(Continued)

*Primary Examiner* — Otis L Thompson, Jr.
*Assistant Examiner* — Jael Ulysse
(74) *Attorney, Agent, or Firm* — Lee, Hong, Degerman, Kang & Waimey

(57) ABSTRACT

The present invention relates to transmission and reception of a frame for a legacy support mode of IEEE 802.16m system for supporting a legacy system. A method of transmitting an uplink signal, in which a signal is transmitted by a user equipment in a wireless mobile communication system, according to the present invention includes the step of transmitting the signal from the user equipment, wherein the signal is transmitted via an uplink frame including 15 OFDMA (orthogonal frequency division multiple access) symbols and wherein the uplink frame comprises a first uplink subframe including 9 OFDMA symbols and a second uplink subframe including 6 OFDMA symbols. Preferably, the user equipment is multiplexed with a second user equipment supporting a legacy system for the wireless mobile communication system only by FDM for an uplink.

8 Claims, 12 Drawing Sheets

(56) References Cited

U.S. PATENT DOCUMENTS

| | | |
|---|---|---|
| 2006/0088008 A1 | 4/2006 | Kim |
| 2007/0195899 A1* | 8/2007 | Bhushan et al. ............. 375/260 |
| 2007/0263735 A1* | 11/2007 | Tong et al. .................... 375/260 |
| 2007/0286147 A1* | 12/2007 | Wang et al. ................... 370/344 |
| 2008/0070582 A1* | 3/2008 | Cai ............................... 455/450 |
| 2008/0080629 A1 | 4/2008 | Munzner |
| 2008/0095195 A1* | 4/2008 | Ahmadi et al. ............... 370/478 |
| 2008/0123569 A1* | 5/2008 | Doss et al. .................... 370/280 |
| 2009/0067377 A1* | 3/2009 | Talukdar et al. ............. 370/329 |
| 2009/0131110 A1* | 5/2009 | Balachandran et al. ...... 455/561 |
| 2009/0168745 A1* | 7/2009 | Ahmadi et al. ............... 370/350 |
| 2009/0180459 A1* | 7/2009 | Orlik et al. .................... 370/344 |
| 2009/0185632 A1* | 7/2009 | Cai et al. ....................... 375/260 |
| 2010/0150099 A1* | 6/2010 | Chen et al. .................... 370/330 |
| 2010/0177727 A1* | 7/2010 | Lee et al. ....................... 370/329 |
| 2010/0278083 A1* | 11/2010 | Kwak et al. ................... 370/280 |
| 2011/0032850 A1* | 2/2011 | Cai ............................... 370/280 |
| 2011/0032853 A1* | 2/2011 | Moon et al. ................... 370/280 |
| 2012/0093080 A1* | 4/2012 | Lee et al. ....................... 370/328 |

OTHER PUBLICATIONS

The State Intellectual Property Office of the People's Republic of China Application Serial No. 201080004069.1, Office Action dated May 13, 2013, 7 pages.

* cited by examiner

METHOD FOR TRANSMITTING AND RECEIVING SIGNALS USING A TIME DIVISION DUPLEXING FRAME STRUCTURE

CROSS-REFERENCE TO RELATED APPLICATIONS

This application is the National Stage filing under 35 U.S.C. 371 of International Application No. PCT/KR2010/000053, filed on Jan. 6, 2010, which claims the benefit of earlier filing date and right of priority to Korean Application No. 10-2009-0065904, filed on Jul. 20, 2009, and also claims the benefit of U.S. Provisional Application Ser. Nos. 61/156,545, filed on Mar. 2, 2009, 61/151,198, filed on Feb. 10, 2009, and 61/143,145, filed on Jan. 7, 2009, the contents of which are all incorporated by reference herein in their entirety.

TECHNICAL FIELD

The present invention relates to a wireless communication system, and more particularly, to a wireless communication system using TDD (time division duplex) and OFDM (orthogonal frequency division multiplexing).

BACKGROUND ART

Generally, IEEE (institute of electrical and electronics engineers) is the U.S. oriented international standardization organization and has established 802.16 family s-called 'worldwide interoperability for microwave access (WiMAX) '. The 802.16 work group established the standard for point-to-point microwave transmission, introduced OFDM (orthogonal frequency division multiplexing) for reliable transmission in NLOS (non out-of-sight) configuration, and then established the IEEE 802.16-2006, which is so-called 'air interface for fixed broadband wireless access system' standard, in 2004. Moreover, the 802.16 work group has established IEEE 802.16-2005 (hereinafter abbreviated '16e' as the so-called 'mobile broadband wireless access system' standard having mobility added thereto. The so-called 'wibro system' is compatible with the 16e system. The Wibro system has a bandwidth of 8.75 MHz, while the 16e supports bandwidths of 3 MHz, 5 MHz, 7 MHz, 8.75 MHz and 10 MHz. Besides, IEEE is ongoing to standardize IEEE 802.16m (hereinafter abbreviated '16m') that is the so-called 'Advanced Air Interface with data rates of 100 Mbit/s mobile & 1 Gbit/s fixed' standard. And, the IEEE 802.16m (hereinafter abbreviated '16m' pertains to the so-called 4th generation mobile communication technology.

The 16m supports TDD (time division duplex) mode and FDD (frequency division duplex) mode and also supports H-FDDMS (half-FDD mobile station) mode. Unless there is a special description, frame structure characteristics and baseband processing are applied in common to all duplex modes. The 16m uses OFDMA as multiple access scheme in downlink and uplink. The frame can be called a radio frame in the following description. The frame is conceptionally discriminated from a subframe or a super frame.

OFDM symbol is generated by inverse Fourier transform. A duration time of the OFDM symbol can be called 'useful symbol time' Tb. A copy portion of a last Tg part of the useful symbol time is called a cyclic prefix (CP). This is used to collect plural paths and is also used to sustain inter-tone orthogonality. And, Ts is a time resulting from adding Tb and Tg together. FIG. 1 shows such a structure.

FIG. 2 is a diagram for an example of TDD frame structure of a wireless communication system having a transmission band of 8.75 MHz and 'CP=1/8 Tb' A system supporting this frame structure is called 'legacy system' For examples of the legacy system, there are the 16e system using a bandwidth of 8.75 MHz and the Wibro system. A frame used by the legacy system has a frame length of 5 ms and 43 OFDM symbols are included per frame. Since resource allocation is performed by symbol unit in the legacy system, it is possible to discriminate uplink and downlink from each other by symbol unit. In FIG. 2, 27 symbols on the left side are used for downlink, while 15 symbols on the right side are used for uplink. A ratio of downlink to uplink in the legacy system can be set to 27:15, as shown in FIG. 2. Yet, the number of uplink OFDM symbols is variable up to 12 to 18. In addition, one OFDM symbol is utilized as TTG (transmit transition gap) or RTG (receive transition gap).

Since the 16m has to support backward compatibility, it should be able to support the legacy frame structure shown in FIG. 2.

DISCLOSURE OF INVENTION

Technical Problem

However, the OFDM parameters and frame structure of the current 16m system are defined for the system bands of 5 MHz, 10 MHz and 20 MHz only. And, a frame structure for the 8.75 MHz system band has not been defined so far. Therefore, it is unable to support the backward compatibility for the aforesaid legacy system having the 8.75 MHz system band.

Solution to Problem

Accordingly, the present invention is directed to a method and apparatus for transmitting and receiving a signal using a time division duplexing frame structure in a wireless communication system that substantially obviates one or more of the problems due to limitations and disadvantages of the related art.

An object of the present invention is to provide a method of designing and using a 16m frame structure backward-compatible with a frame structure of a legacy system for a 16m system and apparatus therefore. In the following description, the legacy system is understood as having 8.75 MHz system band without special notification.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting an uplink signal in a user equipment in a wireless mobile communication system, the method comprises transmitting a signal transmitted on an uplink frame comprising 15 OFDMA (orthogonal frequency division multiple access) symbols from the user equipment, wherein the uplink frame comprises a first uplink subframe including 9 OFDMA symbols and a second uplink subframe including 6 OFDMA symbols.

Preferably, the user equipment is multiplexed by any one of FDM (frequency division multiplexing) and TDM (time division multiplexing) for a second user equipment supporting a legacy system for the wireless mobile communication system only and an uplink.

To further achieve these and other advantages and in accordance with the purpose of the present invention, a method of transmitting an uplink signal in a user equipment in a wireless mobile communication system, the method comprises transmitting a signal from the user equipment on an uplink frame comprising 15 OFDMA symbols, wherein the signal is transmitted on an uplink subframe comprising 6 OFDMA symbols as the uplink subframe included in the uplink frame.

Preferably, the uplink frame includes 2 uplink frames, each of which comprises the 6 OFDMA symbols, and 3 OFDMA symbols and the signal is transmitted on the 2 uplink frames only.

More preferably, the user equipment is multiplexed by TDM for a second user equipment supporting a legacy system for the wireless mobile communication system only and an uplink, and wherein the 3 OFDMA symbols are used for the uplink signal transmitted by the second user equipment.

Preferably, the uplink frame comprises 1 uplink frame comprises the 6 OFDMA symbols and 9 OFDMA symbols and the signal is transmitted on the 1 uplink frame only.

More preferably, the user equipment is multiplexed by TDM for a second user equipment supporting a legacy system for the wireless mobile communication system only and an uplink, and wherein the 6 OFDMA symbols are used for the uplink signal transmitted by the second user equipment.

To further achieve these and other advantages and in accordance with the purpose of the present invention, a method of receiving an uplink signal in a base station in a wireless mobile communication system, the method comprises receiving the signal on an uplink frame comprising 15 OFDMA (orthogonal frequency division multiple access) symbols, wherein the uplink frame includes a first uplink subframe comprising 9 OFDMA symbols and a second uplink subframe comprising 6 OFDMA symbols.

Preferably, a first user equipment transmitting the signal is multiplexed by FDM for a second user equipment supporting a legacy system for the wireless mobile communication system only and an uplink.

To further achieve these and other advantages and in accordance with the purpose of the present invention, a method of receiving an uplink signal in a base station in a wireless mobile communication system, the method comprises receiving the signal on an uplink frame comprising 15 OFDMA (orthogonal frequency division multiple access) symbols, wherein the signal is transmitted on an uplink subframe comprising 6 OFDMA symbols as the uplink subframe included in the uplink frame only.

Preferably, the user equipment transmitting the signal is multiplexed by TDM (time division multiplexing) for a second user equipment supporting a legacy system for the wireless mobile communication system only and an uplink, the uplink frame includes 2 uplink frames comprising the 6 OFDMA symbols and 3 OFDMA symbols, the signal is transmitted on the 2 uplink frames only, and the 9 OFDMA symbols are used for the uplink signal transmitted by the second user equipment.

Preferably, the user equipment transmitting the signal is multiplexed by TDM for a second user equipment supporting a legacy system for the wireless mobile communication system only and an uplink, the uplink frame includes 1 uplink frame comprising the 6 OFDMA symbols and 9 OFDMA symbols, the signal is transmitted on the 1 uplink frame only, and the 3 OFDMA symbols are used for the uplink signal transmitted by the second user equipment.

Preferably, the uplink signal transmitting method further comprises receiving the downlink signal by the user equipment. And, the downlink signal is transmitted on a downlink subframe comprising 6 OFDMA symbols only.

Preferably, the uplink signal receiving method further comprises transmitting the downlink signal to the user equipment from the base station. And, the downlink signal is transmitted on a downlink subframe comprising 6 OFDMA symbols only.

Preferably, a bandwidth of the wireless mobile communication system is 8.75 MHz.

Preferably, the wireless mobile communication system uses a TDD (time division duplex) scheme.

Preferably, a ratio (G) of a useful symbol duration time for a cyclic prefix duration of the OFDMA symbol is 1/8.

Besides, the above methods can further comprise receiving information indicating that the uplink frame structure is used, from the base station.

It is to be understood that both the foregoing general description and the following detailed description are exemplary and explanatory and are intended to provide further explanation of the invention as claimed.

Advantageous Effects of Invention

Accordingly, the present invention designs a 16m frame structure backward-compatible with a frame structure of a legacy system, thereby providing a method of using the designed 16m frame structure for a 16m system and apparatus therefore.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Reference will now be made in detail to the preferred embodiments of the present invention, examples of which are illustrated in the accompanying drawings. Detailed descriptions disclosed in the following with reference to the accompanying drawings are intended not to indicate the only embodiment of the present invention but to explain exemplary embodiments of the present invention.

In the following detailed description of the invention, details are included to help the full understanding of the present invention. Yet, it is apparent to those skilled in the art that the present invention can be implemented without these details. For instance, although the following descriptions are made in detail on the assumption that a wireless mobile communication system includes IEEE 802.16m system, they are applicable to other systems sharing the features of the present invention.

Occasionally, to prevent the present invention from getting more vague, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, eNode B, a base station and the like.

The present invention intends to provide a method and apparatus for communication using a TDD (time division duplex) frame structure enabling compatibility between an IEEE 802.16m system having a transmission bandwidth of 8.75 MHz and a CP (cyclic prefix) of 1/8 Tb and another wireless communication system having 8.75 MHz. In this case, the 'frame' can be named 'radio frame'. In this case, the frame is conceptionally discriminated from a subframe or a super frame.

This disclosure refers to IEEE 802.16m-07/002r4, "802.16m System Requirements.", IEEE 802.16m-08/003r6, "The Draft IEEE 802.16m System Description Document.", IEEE P802.16 Rev2/D7, "Draft IEEE Standard for Local and Metropolitan Area Networks: Air Interface for Broadband Wireless Access," October 2008, IEEE 802.16m-08/050, "IEEE 802.16m Amendment Working Document.", and "WiMAX Forum™ Mobile System Profile Release 1.0 Approved Specification (Revision 1.7.1: 2008-11-07)".

Figure 1:
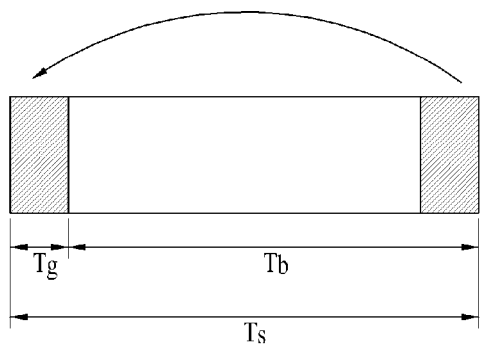
FIG. 1 is a diagram for a structure of OFDM symbol.

The features of OFDMA signal in a time domain have the former features described with reference to FIG. 1. Meanwhile, it is necessary to look into a basic structure of OFDM symbol in order to describe the features of the OFDMA signal in frequency domain. First of all, one OFDMA symbol is constructed with a plurality of subcarriers. And, the number of the subcarriers determines a size of FFT (fast Fourier transform). In this case, various kinds of types can exist for the subcarriers. In particular, there are a pilot subcarrier type for various estimations, a null carrier type for GB (guard band) and DC (direct current) carriers with non-occurrence of transmission, and the like. The guard band provides a region for a signal to naturally attenuate and generates a shape of FFT 'brick wall'.

In the following description, basic parameters used for the description of the present invention are introduced. Features of OFDMA symbol are determined by the four basic parameters in the following. First of all, the features of the OFDMA symbol are determined by a nominal channel bandwidth (BW), the number Nused of actually used subcarriers including DC subcarrier, a sampling factor n and a rate G of CP duration length over the 'useful symbol time'. In this case, 'n' determines an inter-subcarrier interval and a length of the useful symbol time with BW and Nused. The 'n' has a value of 8/7 for a channel bandwidth having a multiple value of 1.75 MHz. And, the 'n' has a value of 28/25 for a channel bandwidth having a multiple value of 1.25 MHz. In this case, the 'G' can have a value of 1/8 or 1/16.

In the following description, derivable parameters derived from the basic parameters include NFFT, $F_s$, $\Delta f$, $T_b$, $T_g$, $T_s$ and a sampling time. The NFFT is a smallest one of numbers greater than Nused among squares of 2. The $F_s$ is a sampling frequency and satisfies a relation of $$F_S = \text{floor}(n \cdot BW/8000) \times 8000.$$

The $\Delta f$ is an inter-subcarrier interval and satisfies $$\Delta f = F_S/N_{FFT}.$$

The $T_b$ is a useful symbol time and satisfies $$T_b = 1/\Delta f.$$

The $T_g$ is a CP duration time and satisfies $$T_g = G \cdot T_b.$$

The $T_s$ us a duration time of OFDMA symbol and satisfies a relation of $$T_S = T_b + T_g.$$

And, a length of the sampling time is $T_b/N_{FFT}$.

Examples of the values available for the basic and derivable parameters are shown in Table 1. In particular, Table 1 is included in the IEEE 802.16m-08/050, 'IEEE 802.16m Amendment Working Document'.

TABLE 1

| | Nominal channel bandwidth BW (MHz) | | | | |
| --- | --- | --- | --- | --- | --- |
| | 5 | 7 | 8.75 | 10 | 20 |
| Sampling factor, n | 28/25 | 8/7 | 8/7 | 28/25 | 28/25 |
| Sampling frequency, $F_s$ (MHz) | 5.6 | 8 | 10 | 11.2 | 22.4 |

TABLE 1-continued

| | | Nominal channel bandwidth BW (MHz) | | | | |
|---|---|---|---|---|---|---|
| | | 5 | 7 | 8.75 | 10 | 20 |
| FFT size, $N_{FFT}$ | | 512 | 1024 | 1024 | 1024 | 2048 |
| Subcarrier interval, $\Delta_f$ (kHz) | | 10.94 | 7.81 | 9.77 | 10.94 | 10.94 |
| Useful symbol time, $T_b$ (us) | | 91.4 | 128 | 102.4 | 91.4 | 91.4 |
| CP rate, $G = 1/8$ | OFDMA symbol duration time, $T_s$ (us) | 102.82 | 144 | 115.2 | 102.82 | 102.82 |
| | No. of OFDMA symbols in 5 ms frame | 48 | 34 | 43 | 48 | 48 |
| | Idle time(us) | 62.86 | 104 | 46.40 | 62.86 | 62.86 |
| CP rate, $G = 1/16$ | OFDMA symbol duration time. $T_s$ (us) | 97.143 | [TBD] | 108.8 | 97.143 | 97.143 |
| | No. of OFDMA symbols in 5 ms frame | 51 | [TBD] | 45 | 51 | 51 |
| | Idle interval duration time (us) | 45.71 | [TBD] | 104 | 45.71 | 45.71 |
| No. of guard subcarriers | Left | 40 | 80 | 80 | 80 | 160 |
| | Right | 39 | 79 | 79 | 79 | 159 |
| No. of used subcarriers | | 433 | 865 | 865 | 865 | 1729 |
| No. of physical resource blocks (18 × 6) | | 24 | 48 | 48 | 48 | 96 |

In the following description, a transmission signal is explained.

Formula 1 indicates a voltage of a transmission signal for an antenna in random OFDMA symbol. This voltage is a function of time.

MathFigure 1

$$S(t) = \text{Re}\left\{ e^{j2\pi f_c t} \sum_{\substack{k=-(N_{used}-1)/2 \\ k \neq 0}}^{(N_{used}-1)/2} c_k \cdot e^{j2\pi k \Delta f(t-T_g)} \right\} \quad \text{[Math. 1]}$$

In Formula 1, 't' is a time elapsing from a start time of a corresponding OFDMA and has a relation of $$0 < t < T_s.$$

$C_k$ is a complex number and indicates data carried on a subcarrier having a frequency offset index k in a corresponding OFDMA symbol. The $C_k$ specifies a prescribed point in QAM constellation. The Tg indicates a guard interval duration time. The Ts indicates OFDMA symbol duration time including Tg. And, the Δf indicates a subcarrier frequency interval.

In the following description, definitions of basic terminologies used for a transmission chain are explained.

Figure 3:
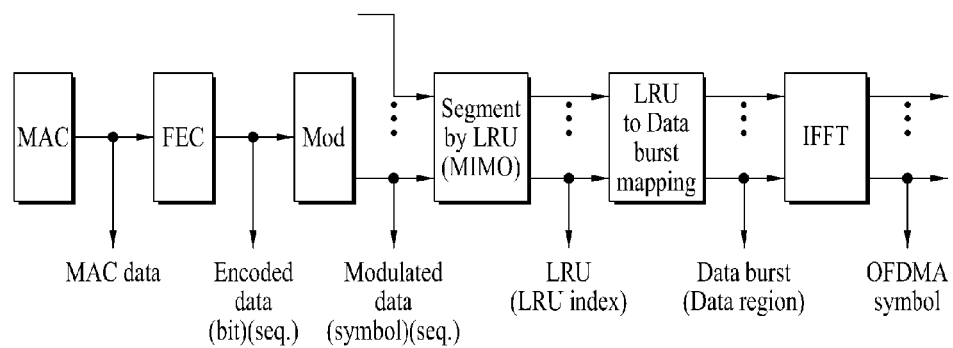
FIG. 3 is a diagram for an example of a transmission chain for transmitting OFDM symbols.

FIG. 3 is a diagram for an example of a transmission chain for transmitting OFDM symbols.

Referring to FIG. 3, media access control (hereinafter abbreviated MAC) is the general term for control schemes for controlling collision/contention in using a medium if several user equipments share the same medium with each other. FEC (forward error correction) is the following scheme. First of all, a transmitting side attaches side information to a text or frame and then transmits the side information attached text or frame. If a receiving side discovers error, it performs error detection and error correction using the side information. Modulation (mod) means that signal information is converted in a manner that strength, displacement, frequency or phase of a signal or the like is converted suitable for a channel characteristic if a transmission medium. MIMO (multiple input multiple output) means the multi-antenna technology for achieving fast communication using multiple antennas. A logical resource unit (LRU) is a virtual basic unit for resource allocation. IFFT is the algorithm for reducing calculation load of Discrete Fourier transform. According to the transmission chain shown in FIG. 3, MAC data is coded by an FEC stage. The coded data is transformed into modulated symbols by a modulating stage. The modulated symbols are resource-mapped by LRU unit. In doing so, MIMO can be taken into consideration. Subsequently, LRUs are mapped into a burst region and then passes through an IFFT stage to generate OFDMA symbols.

In the following description, a structure of a frame used for the technical field of the present invention is explained. First of all, a type-1 subframe described in the present invention is constructed with 6 OFDM symbols, a type-2 subframe described in the present invention is constructed with 7 OFDM symbols, a type-3 subframe described in the present invention is constructed with 5 OFDM symbols, and a type-4 subframe described in the present invention is constructed with 9 OFDM symbols.

Figure 4:
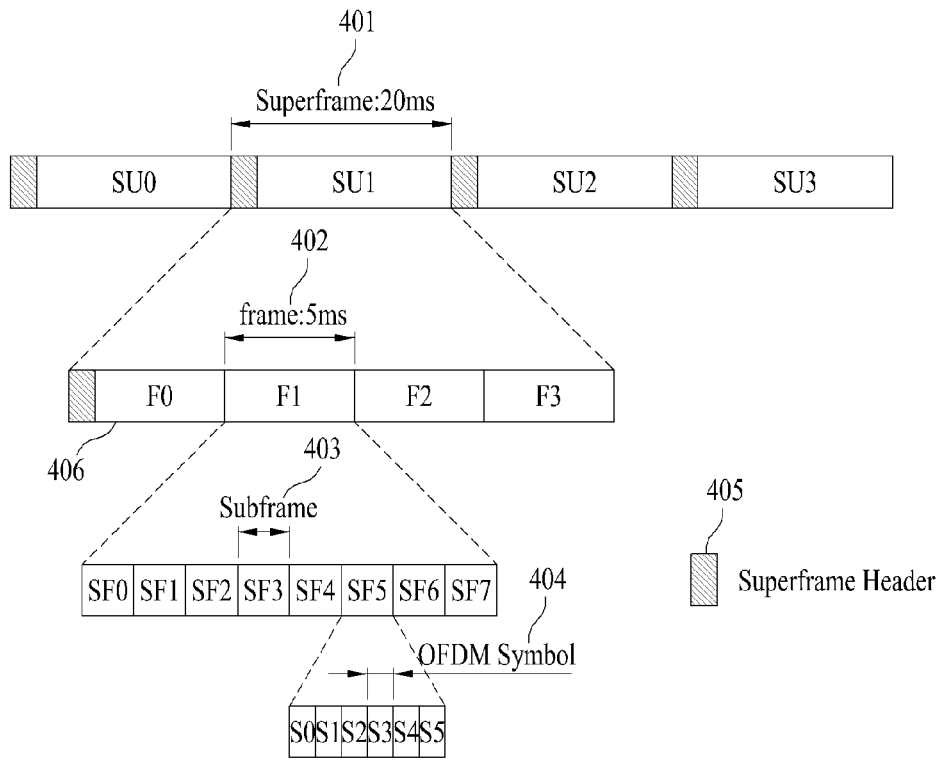
FIG. 4 is a diagram for an example of a basic frame structure for the 16m system.

FIG. 4 is a diagram for an example of a basic frame structure for the 16m system.

Referring to FIG. 4, a super frame 401 having a duration time of 20 ms is divided into four radio frames 402 each of the four radio frames 402 has a 5 ms duration time and the four radio frames 402 are equal to each other in size. In using the same OFDMA parameters having the channel bandwidth of 20 MHz in Table 1, each frame having the 5 ms duration time is constructed with 8 subframes 403. One of the subframes can be allocated for either uplink transmission or downlink transmission. According to a size of cyclic prefix, two kinds of subframe types, i.e., a type-1 subframe and a type-2 subframe exist. The type-1 subframe is constructed with 6 OFDMA symbols 404. The type-2 subframe is constructed with 7 OFDMA symbols [not shown in the drawing]. In the above-mentioned two subframe types, prescribed symbols may include idle symbols.

The basic frame structure is applicable to both FDD and TDD duplexing schemes including H-FDD MS operation. Assuming that a point, at which such a switching in uplink/downlink direction as a switching from uplink to downlink and a switching to uplink from downlink occurs, is defined as a switching point, the number of defaults of the switching point within each frame in TDD system is 2. Yet, maximum 4 switching points can be taken into consideration in accordance with a prescribed embodiment. In case that H-FDD MS is included in FDD system, a frame structure of the FDD system is similar to a TDD frame structure in viewpoint of the H-FDD MS. Uplink transmission and downlink transmission take place on two separate frequency bands, respectively. A transmission gap between uplink and downlink or between downlink and uplink is necessary if transmitting and receiving circuits are switched.

Every super frame includes a super frame header (hereinafter abbreviated SFH) 405. The SFH is located at a first downlink frame 406 of the super frame and includes a broadcast channel.

In the following description, a 16m frame structure in case of 'CP=1/8 Tb' is explained. Specifically, an FDD frame structure, an H-FDD frame structure and a TDD frame structure are described in order.

First of all, the FDD frame structure is explained. A base station (BS) supporting an FDD mode is able to simultaneously support a mobile station (MS) supporting a half duplex transmission scheme and a mobile station supporting a full duplex transmission scheme. The mobile station supporting the FDD uses either H-FDD or FDD. An FDD frame is formed on the basis of the above described basic frame structure. In each frame, all subframes are available for both downlink and uplink transmissions. The uplink an downlink transmissions are separated from each other in a frequency domain. The mobile station supporting the FDD receives burst data within a downlink subframe as soon as accesses an uplink subframe. The mobile station supporting the H-FDD is able to perform either transmission or reception within each subframe.

Figure 5:
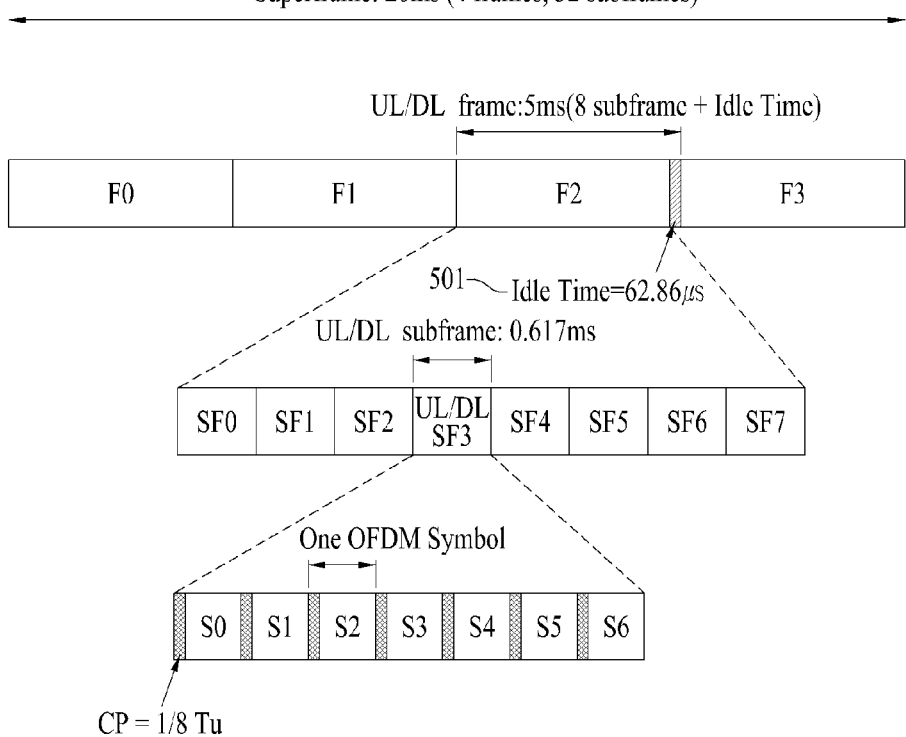
FIG. 5 is a diagram for an example of FDD frame structure applicable to nominal channel bandwidths of 5 MHz, 10 MHz and 20 MHz if G=1/8.

FIG. 5 is a diagram for an example of FDD frame structure applicable to nominal channel bandwidths of 5 MHz, 10 MHz and 20 MHz if G=1/8.

Referring to FIG. 5, one super frame of 20 ms length is constructed with 4 frames each of which has 5 ms length. Each of the frames includes 8 subframes and an idle time (interval). One of the subframes has a length of 0.617 ms and includes total 7 OFDM symbols. The idle time specified in Table 1 is arranged at the last 100 of each FDD frame, as shown in FIG. 4.

In the following description, a TDD frame structure is described. First of all, the TDD frame structure is generated based on the aforesaid basic frame structure. If a ratio of downlink to uplink is set to D:U, in a TDD frame having the DL-to-UL is D:U, first consecutive D subframes and the rest of U subframes are allocated for downlink and uplink, respectively. In this case, 'D+U=8' is set for a channel bandwidth of 5 MHz, 10 MHz or 20 MHz. The ratio of 'D:U' for the channel bandwidth of 5 MHz, 10 MHz or 20 MHz can have a value determined in advance. In each frame, TTG is inserted between downlink and uplink, while RTG is inserted in an end of each frame.

Figure 6:
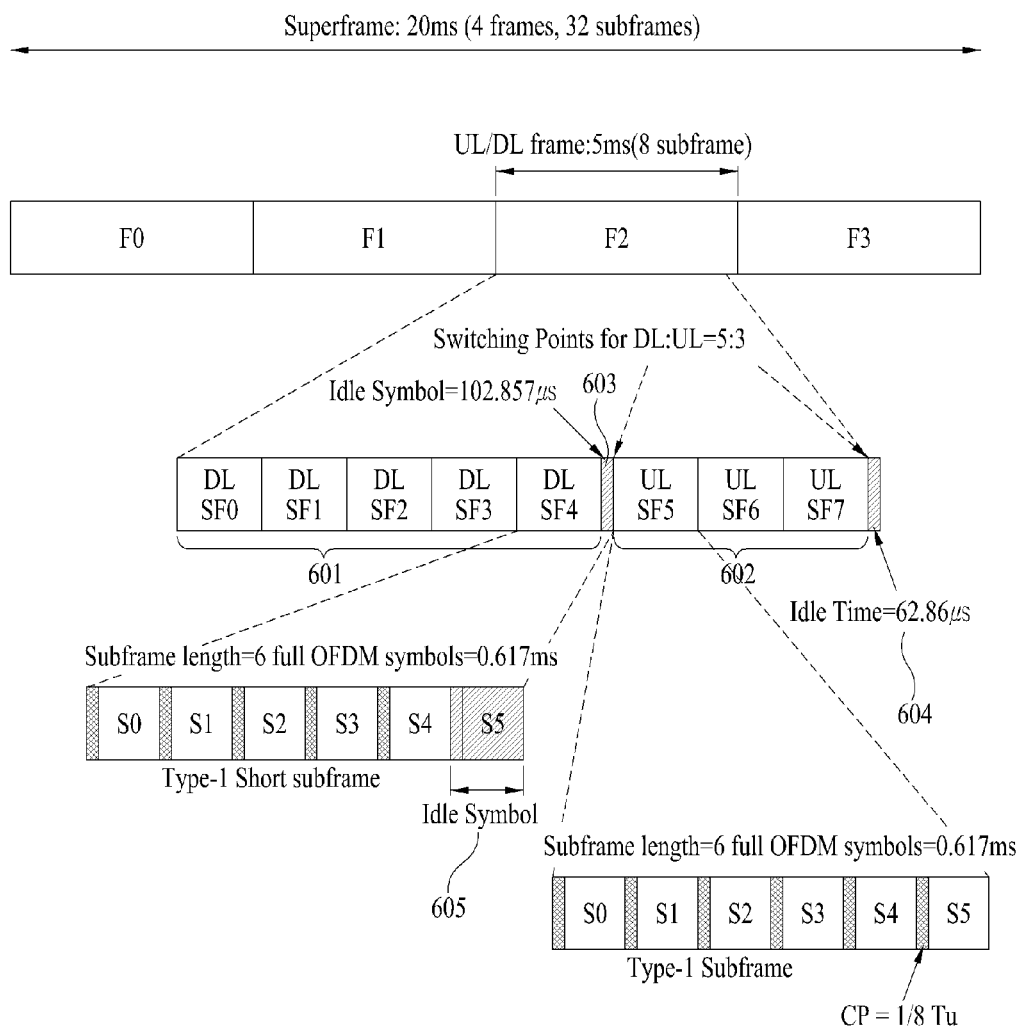
FIG. 6 is a diagram for an exemplary structure having D:U=5:3 as an FDD frame structure applicable to nominal channel bandwidths of 5 MHz, 10 MHz and 20 MHz if G=1/8.

FIG. 6 is a diagram for an exemplary structure having D:U=5:3 as an FDD frame structure applicable to nominal channel bandwidths of 5 MHz, 10 MHz and 20 MHz if G=1/8.

Referring to FIG. 6, first consecutive D (=5) subframes 601 and the rest U (=3) subframes 602 are allocated for downlink and uplink, respectively. TTG is inserted in a gap 603 between downlink and uplink, while RTG is inserted in an end of a frame 604. A last OFDM symbol 605 of a last frame for downlink is allocated as an idle symbol.

In the following description, a 16m frame structure in case of 'CP=1/16 Tb' is explained. For 5 MHz, 10 MHz and 20 MHz channel bandwidths, one frame has 5 type-1 subframes and 3 type-2 subframes. In TDD frame, first and last subframes within each frame may include the type-2 subframes. In the type-2 subframe ahead of a switching point from downlink to uplink, a last OFDMA symbol is an idle symbol. This idle symbols is used as a gap required fro the switching from downlink to uplink. In FDD frame, first, fifth and last subframes of each frame can include the type-2 subframes.

Figure 7:
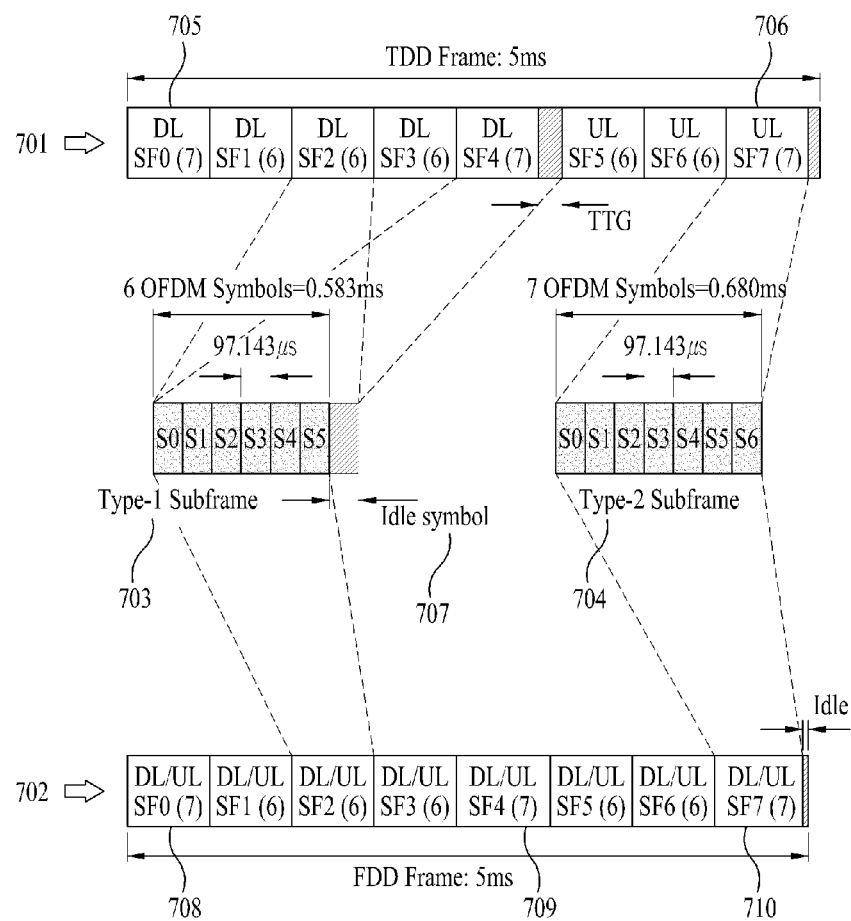
FIG. 7 is a diagram for examples of structures of TDD and FDD frames 701 and 702 if CP=1/16 Tb.

FIG. 7 is a diagram for examples of structures of TDD and FDD frames 701 and 702 if CP=1/16 Tb.

Referring to FIG. 7, as an OFDMA symbol duration type is 97.143 µs and a duration time of a CP is 1/16 Tb, a length of a type-1 subframe 703 is 0.583 ms and a length of a type-2 subframe 704 is 0.680 ms. One frame 701/702 includes 5 type-1 subframes 703 and 3 type-2 subframes 704. In TDD frame, first and last subframes 705 and 706 within each frame 701 include the type-2 subframes. In the type-2 subframe ahead of a switching point from downlink to uplink, a last OFDMA symbol 707 is an idle symbol. In the FDD frame 702, first, fifth and last subframes 708, 709 and 710 of each frame include the type-2 subframes.

Figure 2:
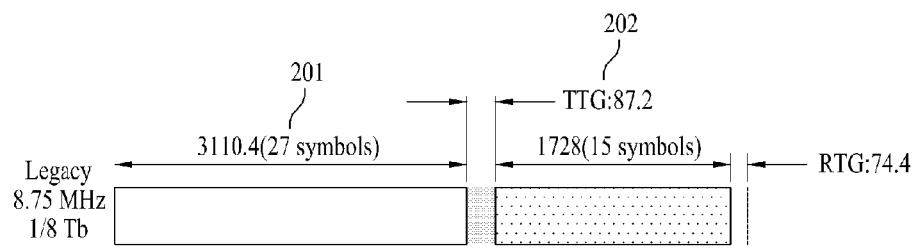
FIG. 2 is a diagram for an example of TDD frame structure of a wireless communication system having a transmission band of 8.75 MHz and 'CP=1/8 Tb'.

As mentioned in the foregoing description with reference to FIG. 2, resources are allocated by symbol unit in the 16e system. Yet, in the frame structure of the 16m system having the 8.75 MHz system band, resources are allocated but by the symbol unit but by the subframe unit, as described with reference to FIGS. 4 to 7. In this case, a plurality of symbols construct one subframe. The number of the OFDM symbols allocated to one subframe can be set to 6 for the type-1, 7 for the type-2 or 5 for the type-3.

As mentioned in the foregoing description, the 16m system includes type-1 and type-2 subframes. In case of TDD, a type-1 short subframe having 5 symbols is added thereto. Therefore, the 16m system configures a frame constructed with subframe of total three types. The type-1 short subframe shall be named a type-3 subframe in the following description. When a transmitter and a receiver exchange frames with each other, a minimum size of TTT, which is a basic unit of data transmission/reception. Hence, a frame is preferably constructed with subframes of single type in order that a pilot of a physical layer can have the same configuration and design of a resource block. In particular, one frame is constructed with subframes of type-1, type-2 or type-3 only. Yet, one frame can be constructed with subframes of at least two different types.

The present invention relates to a new frame structure, which has a bandwidth of 8.75 MHz, supports a terminal or user equipment for the above mentioned legacy system, and is used for the 16m as a TDD frame having 'CP=1/8 Tb'. For this structure, if a new frame such as a subframe constructed with 3 or 9 symbols is defined as well as the subframes of the three kinds of types including the type-1, the type-2 and the type-3, it may become a burden imposed on designing a new physical structure. Therefore, it is preferable that a new subframe type is not defined in addition to the previously existing subframe types. In designing a new frame structure, it is able to abide by the following references.

1) A new frame structure is constructed with subframes of three kinds of types including a type-1, a type-2 and a type-3.

2) Introduction of a new subframe type is excluded.

3) Type-1 subframes are used as many as possible. This is because a type-1 subframe is a default subframe type optimized for PHY design.

4) A new frame structure should have commonalities between TDD and FDD.

5) A switching point of a TDD frame structure having 'CP=1/16 Tb' should be in accord with a switching point of a 16m system having 'CP=1/8 Tb'.

Referring to Table 1, the number of OFDM symbols available for one frame in a system having 8.75 MHz transmission band and a CP length of '1/8 Tb is 43. Like the above described basic frame structure, one subframe can be constructed by unit of 6 symbols, 7 symbols or 5 symbols resulting from excluding one symbol for TGG for TDD. In this case, for the system having 8.75 MHz transmission band and a CP length of '1/8 Tb', one of total 43 symbols is utilized as an idle interval (idle time) for TTG and RTG and the rest of 42 symbols are tied together by unit of 6 symbols to configure 7 subframes. Under this configuration, it is able to configure a frame using subframes of one kind of type including 6 symbols only in the same manner of the configuration of the basic frame structure.

Figure 8:
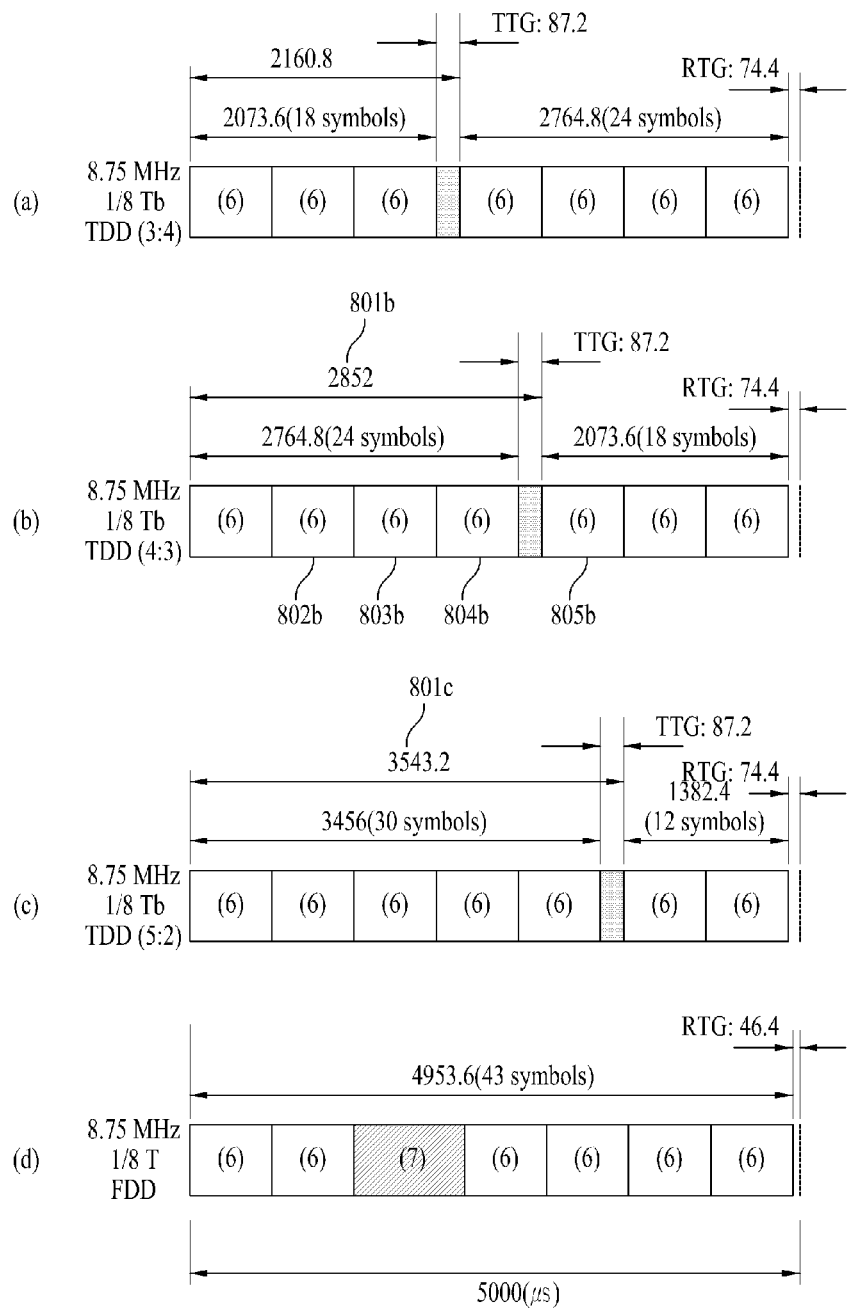
FIG. 8 is a diagram for examples of a frame structure of a 16m system using a bandwidth of 8.75 MHz if CP=1/8 Tb.

FIG. 8 is a diagram for examples of a frame structure of a 16m system using a bandwidth of 8.75 MHz and 'CP=1/8 Tb'. FIGS. 8(a) to 8(c) show examples for a case that 6 OFDM symbols construct one subframe in frame structures of a 16m TDD system using 8.75 MHz transmission bandwidth and 'CP=1/8 Tb'. And, FIG. 8(d) shows an example of a frame structure of a 16m FDD system using 8.75 MHz transmission bandwidth and 'CP=1/8 Tb'.

In particular, FIG. 8(a) shows a case that a ratio of uplink to downlink is 3:4, FIG. 8(b) shows a case that a ratio of uplink to downlink is 4:3, and FIG. 8(c) shows a case that a ratio of uplink to downlink is 5:2. In this case, TTG is 87.2 μs and RTG is 74.4 μs. This is identical to those of WiMAX profile. It is identical in that the number of subframes included in the FDD frame structure according to FIG. 8(d) is equal to that of subframes included in the TDD frame structure. Yet, it is different from the TDD frame structure in that one of the subframes of the FDD frame is a type-2 subframe. Although FIG. 8(d) shows that a 4th subframe within FDD frame is a type-2 subframe, a position of the type-2 subframe is non-limited by the drawing.

According to the present invention, a 16m frame structure backward-compatible with a frame structure of a legacy system is designed. And, the present invention provides a method of using the designed frame structure for the 16m system and apparatus therefore. Frame structures for the 16m system include 1 16m-only frame structure and a 16m legacy support structure. The 16m-only frame structure is the frame structure available if a user equipment supporting a legacy system only is not used for the 16m system, i.e., a base station and user equipment supporting the 16m system exist only. In the 16m-only frame structure, a 16 user equipment is able to use resources only and backward compatibility needs not to be taken into consideration. On the contrary, in the 16m legacy support frame structure is the frame structure available if a user equipment supporting a 16m system and a user equipment supporting a legacy system only co-exist or a user equipment supporting a legacy system only exists in a base station supporting a 16m system. The user equipments off the two species are multiplexed within the frame structure by FDM or TDM.

As shown in FIG. 7 and FIG. 8, if the above-proposed frame structure of the 16m system having the 8.75 MHz transmission bandwidth and 'CP=1/8 Tb' and the frame structure using 15 uplink symbols in the legacy system having the 8.75 MHz transmission bandwidth and 'CP=1/8 Tb' coexist, the uplink transmission timings of the frame structures of the two system fail to accord with each other. Referring to the legacy system shown in FIG. 2, uplink transmission begins behind a time resulting from adding time (=3110.4 ms) 201 of 27 OFDM symbols and TTG=87.2 ms) 202 together from a transmission start point of a frame. On the contrary, in the 16m system using the frame structure shown in FIG. 8(b), uplink transmission begins 2852 ms (801b) of 24 symbols. And, in the 16m system using the frame structure shown in FIG. 8(c), uplink transmission begins 3543.2 ms (801c). In particular, comparing FIG. 2 and FIG. 8 to each other, it can be observed that an uplink transmission timing in the legacy system is not in accord with that in the 16m system. Thus, if the uplink transmission timing is not in accord, an uplink signal may be simultaneously transmitted while a downlink signal is transmitted. Accordingly, collision between the uplink and downlink signals may take place to make communication impossible. Due to this reason, the demand for a method of matching uplink transmission timing for compatibility between a legacy frame structure and a 16m frame structure having 8.75 MHz system bandwidth is rising.

As mentioned in the forgoing description, in case that a legacy system having 8.75 MHz system bandwidth and a 16m system having 8.75 MHz system bandwidth and CP of '1/8 Tb' coexist, the present invention relates to a 16m TDD frame structure for compatibility between frame structures of the two systems and a method of utilizing the same. As mentioned in the foregoing description, the legacy system having the 8.75 MHz system bandwidth can include the 16e system having 8.75 MHz transmission bandwidth and 'CP=1/8 Tb' proposed in Table 1 or a Wibro system.

As mentioned in the foregoing description, FIG. 8(a) shows a TDD frame structure for a CP length of '1/8 Tb' if a ratio of uplink to downlink is 3:4, FIG. 8(b) shows a TDD frame structure for a CP length of '1/8 Tb' if a ratio of uplink to downlink is 4:3, and FIG. 8(c) shows a TDD frame structure for a CP length of '1/8 Tb' if a ratio of uplink to downlink is 5:2.

Table 2 shows the number of OFDM symbols in uplink/downlink of WiMAX profile. If a system bandwidth is 8.75 MHz, the number of uplink OFDM symbols can be set to one of 7 kinds of values ranging between 12 and 18. Therefore, a frame structure according to the present invention is able to support backward compatibility when a legacy system is operating with 12 or 18 OFDM symbols. In particular, the number of OFDM symbols available for a legacy system can be set to 12 to 18. If a legacy user equipment and a 16m user equipment coexist, a 16m system is able to support backward compatibility by setting the number of OFDM symbols to 12 or 18.

TABLE 2

| Item | Description | Reference | Status | BS Required | BS Values | MS Required | MS Values | Comment |
|------|-------------|-----------|--------|-------------|-----------|-------------|-----------|---------|
| 1 | Number of OFDM Symbols in DL and UL for 5 and 10 | 8.4.4.2 | oi | Y | (35, 12), (34, 13), (33, 14), (32, 15), (31, 16), | Y | The same as BS values | |

TABLE 2-continued

| Item | Description | Reference | Status | BS Required | BS Values | MS Required | MS Values | Comment |
|------|-------------|-----------|--------|-------------|-----------|-------------|-----------|---------|
|      | MHz BW      |           |        |             | (30, 17), (29, 18), (28, 19), (27, 20), (26, 21) |  |  |  |
| 2 | Number of OFDM Symbols in DL and UL for 8.75 MHz BW | 8.4.4.2 | oi | Y | (30, 12), (29, 13), (28, 14), (27, 15), (26, 16), (25, 17), (24, 18) | Y | The same as BS values |  |
| 3 | Number of OFDM Symbols in DL and UL for 7 and 3.5 MHz BW | 8.4.4.2 | Oi | Y | (24, 09), (23, 10), (22, 11), (21, 12), (20, 13), (19, 14), (18, 15) | Y | The same as BS values |  |

Yet, if a legacy system has to operate with 15 UL OFDM symbols, other 16 frame structures for legacy support should be defined in a manner that a new subframe type is not defined in a 16m legacy support mode in order to support a 16m user equipment a user equipment operating with 15 UL OFDM symbols in the 16m legacy support mode.

Figure 9:
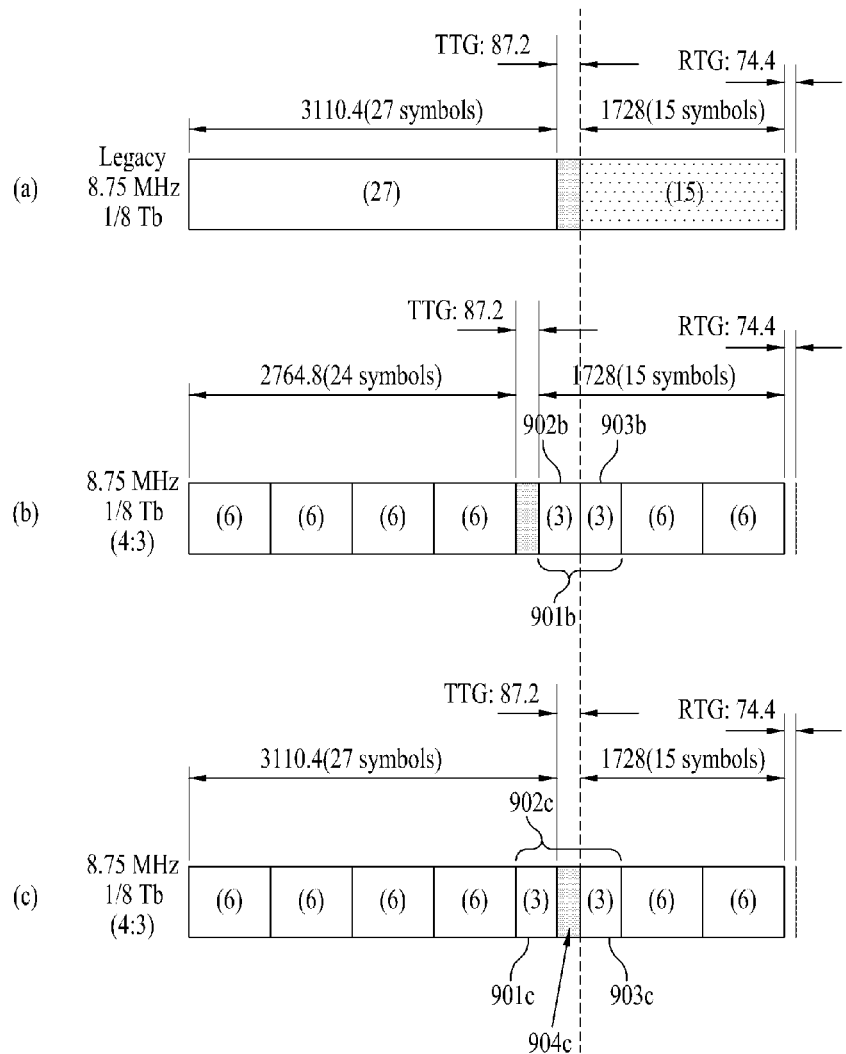
FIG. 9 is a diagram for an example of a 16m TDD frame structure and its utilization scheme for enabling compatibility between a legacy system and a 16m system in case that the two systems coexist.
Figure 10:
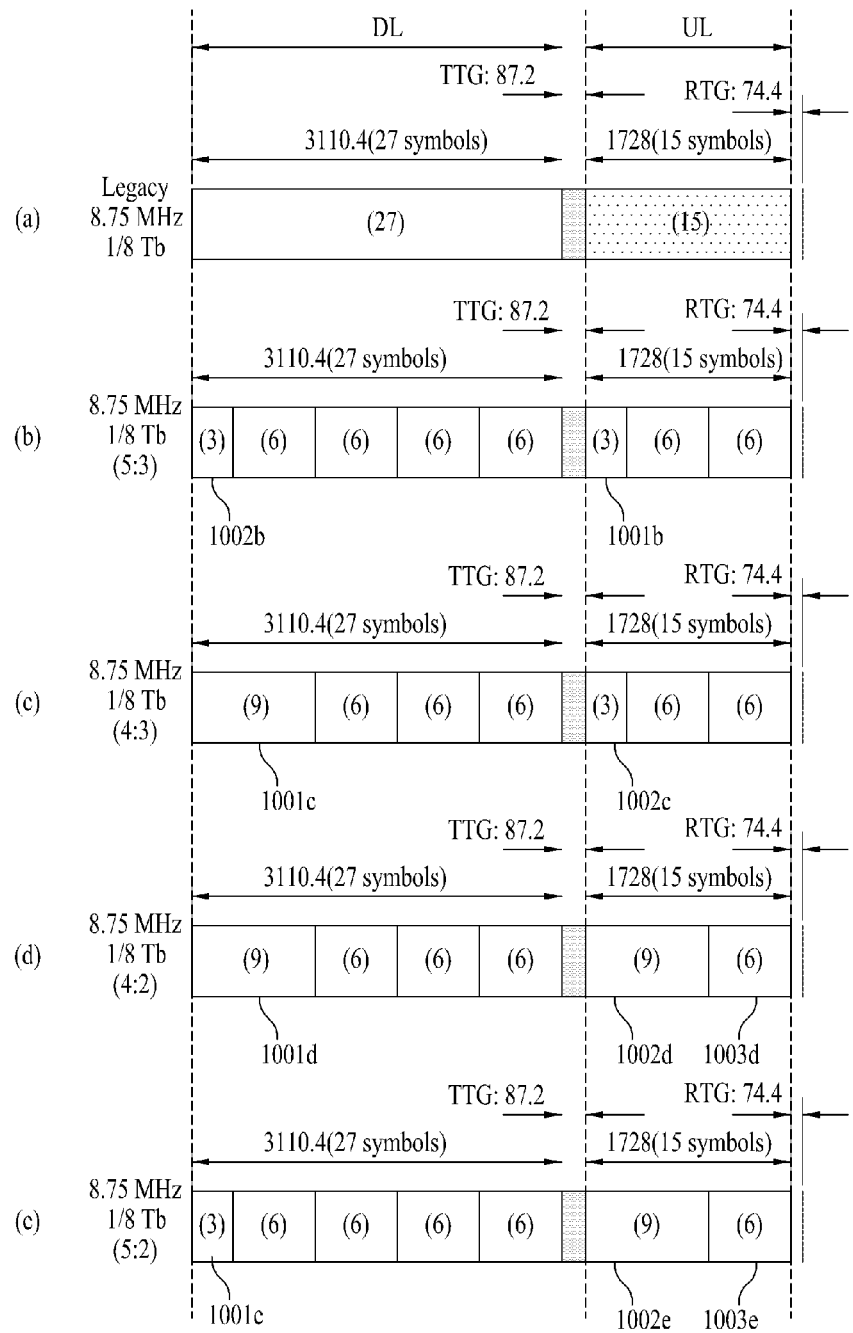
FIG. 10 is a diagram for one example of a frame structure of a 16m system for supporting a legacy mode according to an embodiment of the present invention.
Figure 11:
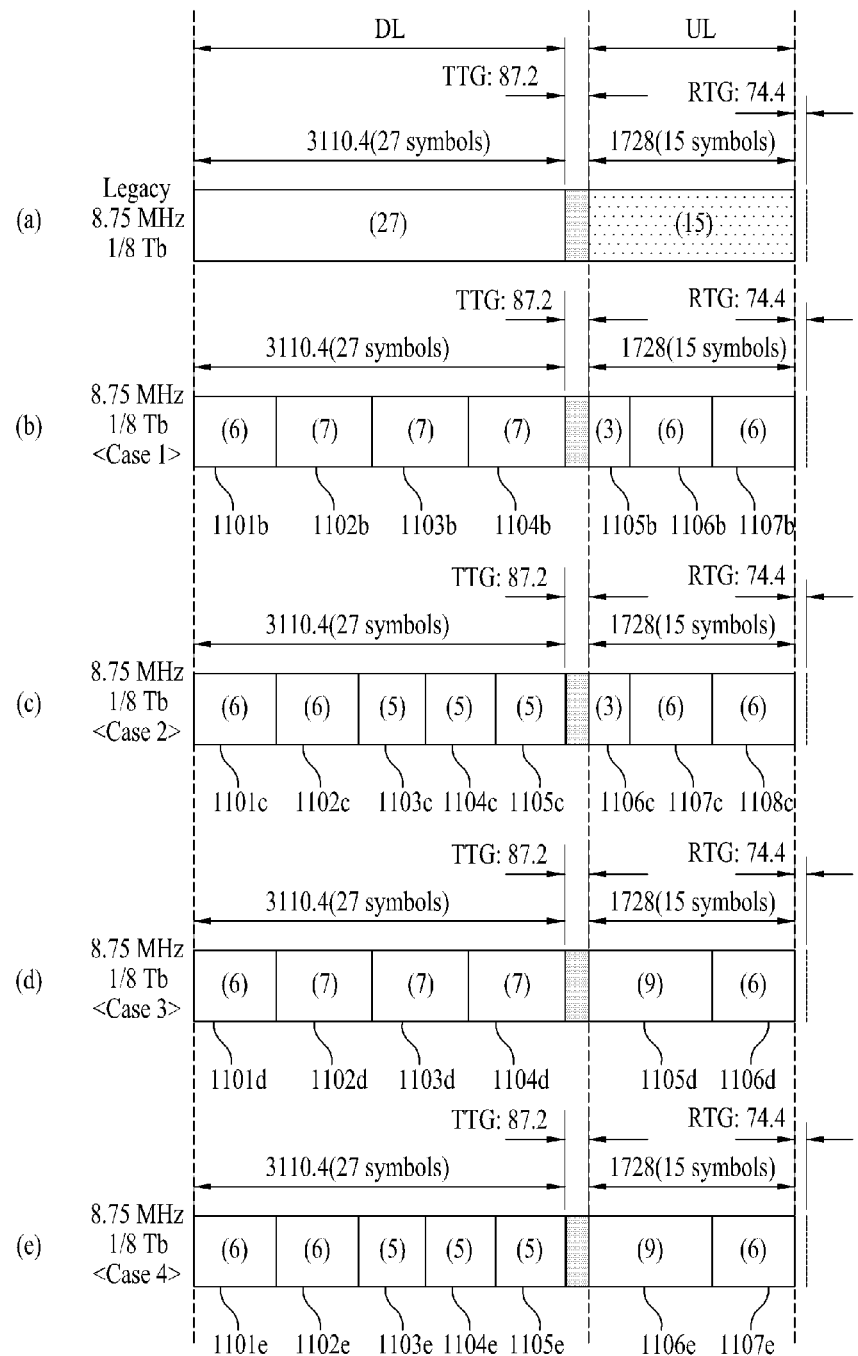
FIG. 11 is a diagram for another example of a frame structure of a 16m system for supporting a legacy mode according to an embodiment of the present invention.

FIGS. 9 to 16 in the following description are provided to explain new TDD frame structures for 16m legacy support mode. With reference to FIGS. 9 to 11, a method of multiplexing a legacy user equipment and a 16 user equipment together is described without discrimination. In particular, for instance, a legacy user equipment and a 16m user equipment can be multiplexed together in uplink by either TDM or FDM.

FIG. 9 is a diagram for an example of a 16m TDD frame structure and its utilization scheme for enabling compatibility between a legacy system and a 16m system in case that the two systems coexist. FIG. 9(a) shows an example for a frame structure of a legacy system. FIG. 9(b) shows an example for a method of fitting a legacy system to transmission timing by dividing one subframe 901 of uplink subframes if UL:DL=4:3 in a 16m TDD frame structure.

FIG. 9(b) shows an example for a first method of fitting transmission timing for an uplink frame to a legacy system, in which UL/DL frame in a 16m frame structure is constructed with subframes each of which includes 6 OFDM symbols only. In this case, 3 OFDM symbols 902b of the UL frame in the 16m frame structure are utilized as an idle interval (time) to fitting a transmission timing to an uplink of the legacy system. If a legacy system having 8.75 MHz transmission bandwidth and a 16m system are simultaneously operated, a base station notifies a 16m-frame-using user equipment by additional signaling to indicate that first 3 OFDM symbols in an UL frame correspond to an idle interval. This signaling is carried on system information or a downlink control channel.

When a legacy system and a 16m system coexist, if the 3 symbols 902b are idled, it is able to maintain a TTI transmission by type-1 subframe unit of 16m defined in a related art 16m frame structure. Moreover, it is unnecessary to design a new PHY structure for 3 symbols in addition to the 6-symbol PHY structure designed in the related art 16m structure shown in FIG. 4. Besides, other 3 symbols 903b remaining behind the idle symbols 902b can be made available for the legacy system.

The number of idle symbols can be set to an arbitrary number as well as 3. Preferably, in order to maintain the configuration of the type-1 subframe of 16m, it is able to allocate 6 symbols 902b and 903b to idle symbols.

FIG. 9(c) shows an example for a second method of fitting transmission timing for an uplink frame to a legacy system, in which UL/DL frame in a 16m frame structure is constructed with subframes each of which includes 6 OFDM symbols only. By the 16m frame structure of the present invention, it is able to fit UL/DL of a legacy system and a transmission start time to each other. 3 symbols 901c in a DL frame is utilized for data and control information of DL of the legacy system. And, 3 OFDM symbols are consecutively allocated to the DL of the legacy system. Moreover, positions of 3 OFDM symbols 901c are changeable. For instance, unlike the drawing shown in FIG. 9(c), the 3 OFDM symbols 901c are located at a first position of the DL of the legacy system. Besides, symbols and TGG interval 902c belonging to a 5th subframe in the 16m frame structure are set to an idle interval (time) for inter-16m UL transmission start time accord, whereby it is able to set a UL:DL ratio to 4:2. Thus, by setting the DL:UL ratio to 4:2, it is able to fit a UL transmission start point of a 16m frame structure having system having a CP length of '1/8 Tb' to that of a 16m frame structure having a CP length of '1/16 Tb'. If a legacy system having 8.75 MHz transmission bandwidth and a 16m system are simultaneously operated, a base station notifies a 16m-frame-using user equipment by additional signaling to indicate that 6 OFDM symbols 901c and 903c belonging to the 5th subframe 902c in the 16m frame structure correspond to an idle interval for inter-16m timing accord. This signaling can be carried on system information or a downlink control channel.

Another embodiment of the present invention relates to a method of constructing a UL/DL frame in a 16m frame structure with subframes each of which includes 6 OFDM symbols only and setting a DL:UL ratio in a legacy to 24:18 or 30:12. In this case, setting the DL:UL ratio to 24:18 or 30:12 is possible because the number of OFDM symbols allocated to an UL frame can be changed into 12-18. In this case, a subframe configuration ratio of DL:UL for the 16m frame structure can be set to 4:3 or 5:2.

The idle interval setting and transmitting method is available for cases other than the case of 1/8 Tb of 8.75 MHz. If a legacy system having an arbitrary channel bandwidth and an arbitrary CP and a 16m system coexist, a start point of an UL interval of the 16m system is adjustable by idling a specific symbol. Thus, interference between UL and DL of a TDD system can be eliminated. And, mutual coexistence between the legacy system and the 16m system is possible.

FIG. 10(*a*) shows an example for a frame structure of a legacy system.

FIG. 10(*b*) shows an example for a third method of fitting transmission timing for an uplink frame to a legacy system, in which UL/DL frame in a 16m frame structure is constructed with subframes each of which includes 6 OFDM symbols only. In this case, 3 OFDM symbols in a first UL frame 805*b* in the 16m-only frame structure proposed in FIG. 8(*b*) are used as a first subframe 1002*b*, with which a DL frame starts as proposed in FIG. 10(*b*), in order to fit a transmission start point to an uplink of a legacy system in a frame structure supporting a 16m legacy. And, first 3 OFDM symbols 1002*b* of the DL frame are used as a subframe for the legacy system. In particular, a first subframe for uplink includes 3 symbols and a first subframe for downlink includes 3 symbols as well. 'Utilizing the first subframe among DL subframes' is attributed to the following reason. First of all, in case that a user equipment supporting a legacy system only and a user equipment operating in a 16m legacy support mode coexist, front subframes among subframes allocated to downlink by TDM in the 16m legacy support mode operate in a legacy mode and rear subframes, each of which includes 6 OFDM symbols, are used for the 16m. Hence, it is able to maintain TTI transmission by type-1 subframe unit of the 16m. And, 3 OFDM symbols 1001*b* allocated to uplink are usable for the legacy system. If a legacy system of 8.75 MHz transmission band and a 16m system are simultaneously operated, a base station notifies a user equipment supporting a 16m legacy support mode via additional signaling to indicate that the first subframe 1002*b* in the DL frame is the subframe having 3 OFDM symbols. In particular, the base station informs the user equipment using the 16m that the legacy support mode is used. The signaling indicates whether the 16m-only mode or the 16m legacy mode is used. This signaling can be carried on system information or a downlink control channel.

The 3 OFDM symbols 1002*b* allocated to a first position of a downlink frame can be allocated between subframes at other positions configuring 6 OFDM symbols within the allocated downlink frame. In particular, although the downlink subframes shown in FIG. 10(*b*) are sequentially constructed with 3 symbols, 6 symbols, 6 symbols, 6 symbols and 6 symbols, respectively, they can be sequentially constructed with 6 symbols, 3 symbols, 6 symbols, 6 symbols and 6 symbols, respectively for example. Yet, considering the legacy system and operations in the 16m legacy support mode, the three symbols are preferably allocated to the first position of the downlink frame, as proposed by the present invention.

FIG. 10(*c*) shows an example for a fourth method of fitting transmission timing for an uplink frame to a legacy system, in which a UL/DL frame in a 16m frame structure is constructed with subframes each of which includes 6 OFDM symbols only. In this case, 3 OFDM symbols in a first UL frame 805*b* in the 16m-only frame structure proposed in FIG. 8(*b*) are used as a subframe 1001*c* including 9 symbols resulting from addition to a first subframe, with which a DL frame starts as proposed in FIG. 10(*c*), in order to fit a transmission start point to an uplink of a legacy system in a frame structure supporting a 16m legacy. The subframe 1001*c* including the 9 symbols can be used for a legacy mode. Thus, the first subframe 100*c* among the DL subframes is used for the legacy mode. This is attributed to the following reason. First of all, in case that a legacy system user equipment and a 16m system user equipment coexist, front subframes among subframes allocated to downlink by TDM in the 16m legacy support mode are used for the legacy mode and rear subframes, each of which includes 6 OFDM symbols, are used for the 16m system. Hence, it is able to maintain TTI transmission by type-1 subframe unit of the 16m. And, 3 OFDM symbols 1002*c* allocated to uplink are usable for the legacy mode. If a legacy system of 8.75 MHz transmission bandwidth and a 16m system are simultaneously operated, a base station notifies a user equipment supporting a 16m legacy support mode via additional signaling to indicate that the first subframe 1002*b* in the DL frame is the subframe having 3 OFDM symbols. In particular, the base station informs a 16m-using user equipment that a first subframe of a DL frame is the subframe including 9 OFDM symbols and that the first subframe 1002*c* of a UL frame is the subframe including 3 OFDM symbols, via additional signaling. In particular, the base station informs the 16m-using user equipment that the 16m legacy support mode is used. This signaling indicates whether the 16m-only mode or the 16m legacy mode is used. And, this signaling can be carried on system information or a downlink control channel.

The 9 OFDM symbols 1001*c* allocated to a first position of a DL frame can be allocated between subframes at other positions configuring 6 OFDM symbols within the DL frame. In particular, although the downlink subframes shown in FIG. 10(*c*) are sequentially constructed with 9 symbols, 6 symbols, 6 symbols and 6 symbols, respectively, they can be sequentially constructed with 6 symbols, 9 symbols, 6 symbols and 6 symbols, respectively for example. Yet, considering operations in the legacy mode and operations in the 16m legacy support mode together, the 9 symbols are preferably allocated to the first position of the DL frame, as proposed by the present invention.

FIG. 10(*d*) shows an example for a fifth method of fitting transmission timing for an uplink frame to a legacy system, in which a UL/DL frame in a 16m frame structure is constructed with subframes each of which includes 6 OFDM symbols only. In this case, 3 OFDM symbols in a first UL frame 805*b* in the 16m-only frame structure proposed in FIG. 8(*b*) are used as a subframe 1001*d* including 9 symbols resulting from addition to a first subframe, with which a DL frame starts as proposed in FIG. 10(*d*), and the rest 3 OFDM symbols of the UL frame are added to a second uplink subframe including 6 OFDM symbols to be used as a subframe 1002*d* including 9 symbols, in order to fit a transmission start point to an uplink of a legacy system in a frame structure supporting a 16m legacy. Thus, the first one of the DL/UL subframes is configured to include 9 OFDM symbols and the corresponding first subframes are used for the legacy mode. This is attributed to the following reason. First of all, in case that a legacy system user equipment and a 16m system user equipment coexist, front subframes 1001 and 1002*d* among subframes allocated to the downlink/uplink by TDM in the 16m legacy support mode are used for the legacy mode and rear subframes, each of which includes 6 OFDM symbols, are used for the 16m system. Hence, it is able to maintain TTI transmission by type-1 subframe unit of the 16m. If a legacy system of 8.75 MHz transmission bandwidth and a 16m system are simultaneously operated, a base station notifies a 16m-using user equipment via additional signaling that each of the first subframes of the DL/UL is the subframe having 9 OFDM symbols. In particular, the base station informs the 16m-using user equipment that the 16m legacy support mode is used. This signaling indicates whether the 16m-only mode or the 16m legacy mode is used. And, this signaling can be carried on system information or a downlink control channel.

The 9 OFDM symbols 1001*d* allocated to a first position of the DL/UL frame can be allocated between subframes at other positions configuring 6 OFDM symbols within the allocated DL. Yet, considering operations in the legacy mode and operations in the 16m legacy support mode together, the 9 symbols are preferably allocated to the first position of the DL/UL frame, as proposed by the present invention.

In the frame structure of the UL 16m legacy support mode, the 16m user equipment and the legacy user equipment can be multiplexed by TDM or FDM. Preferably, in case that they are multiplexed by the TDM, the first subframe 1002d of the uplink is reserved for the legacy user equipment and the second subframe 1003d of the uplink is reserved for the 16m user equipment. In case that they are multiplexed by the FDM, the first and second subframes 1002d and 1003d in the uplink region are used for the legacy user equipment and both of the first and second subframes 1002d and 1003d in the uplink region for the 16m user equipment are reserved for the 16m user equipment, according to the method proposed by the present invention. Yet, the multiplexing is performed by FDM in a manner that a frequency region used in uplink for the legacy user equipment is differentiated from that used in uplink for the 16m user equipment.

FIG. 10(e) shows an example for a sixth method of fitting transmission timing for an uplink frame to a legacy system, in which a UL/DL frame in a 16m frame structure is constructed with subframes each of which includes 6 OFDM symbols only. In this case, 3 OFDM symbols in a UL frame of the 16m-only frame structure proposed in FIG. 8(b) are used as a first subframe 1001e, with which a DL frame starts, in order to fit a transmission time to an uplink of a legacy system and the rest 3 OFDM symbols of the UL frame are added to a second uplink subframe including 6 OFDM symbols to be used as a subframe 1002e including 9 symbols. Thus, the first subframe 1001e of the DL subframes is configured to include 3 OFDM symbols and the corresponding first subframe is used for the legacy mode. This is attributed to the following reason. First of all, in case that a legacy system user equipment and a 16m system user equipment coexist, front subframes among subframes allocated to the downlink by TDM in the 16m legacy support mode are used for the legacy mode and rear subframes, each of which includes 6 OFDM symbols, are used for the 16m system. Hence, it is able to maintain TTI transmission by type-1 subframe unit of the 16m. Meanwhile, the first subframe 1002e of the UL subframes is configured to include 9 OFDM symbols and the corresponding first subframe is used for the legacy mode. This is attributed to the following reason. First of all, in case that a legacy system user equipment and a 16m system user equipment coexist, front subframes among subframes allocated to the uplink by TDM in the 16m legacy support mode are operable in the legacy mode and rear subframes, each of which includes 6 OFDM symbols, are used for the 16m system. Hence, it is able to maintain TTI transmission by type-1 subframe unit of the 16m. If a legacy system of 8.75 MHz transmission bandwidth and a 16m system are simultaneously operated, a base station notifies a 16m-using user equipment via additional signaling that the first subframe 1001e of the DL subframes is the subframe having 3 OFDM symbols and that the first subframe 1002e of the UL subframes is the subframe having 9 OFDM symbols. In particular, the base station informs the 16m-using user equipment that the legacy support mode is used. This signaling indicates whether the 16m-only mode or the 16m legacy mode is used. And, this signaling can be carried on system information or a downlink control channel.

The 3 OFDM symbols 1001e allocated to a first position of the DL frame can be allocated between subframes at other positions configuring 6 OFDM symbols within the allocated DL frame. Yet, considering operations in the legacy mode and operations in the 16m legacy support mode together, the 3 OFDM symbols are preferably allocated to the first position of the DL frame, as proposed by the present invention.

The 9 OFDM symbols 1002e allocated to a first position of the UL frame can be allocated between subframes at other positions configuring 6 OFDM symbols within the allocated UL frame. Considering operations in the legacy mode and operations in the 16m legacy support mode together, the 9 OFDM symbols are preferably allocated to the first position of the UL frame, as proposed by the present invention.

In the UL frame, the 16m user equipment and the legacy user equipment can be multiplexed by TDM or FDM. Preferably, in case that they are multiplexed by the TDM, the first subframe 1002e of the uplink is reserved for the legacy user equipment and the second subframe 1003e of the uplink is reserved for the 16m user equipment. In case that they are multiplexed by the FDM, the first and second subframes 1002e and 1003e in the uplink region are used for the legacy user equipment and both of the first and second subframes 1002e and 1003e in the uplink region for the 16m user equipment are reserved for the 16m user equipment, according to the method proposed by the present invention. Yet, the multiplexing is performed by FDM in a manner that a frequency region used in uplink for the legacy user equipment is differentiated from that used in uplink for the 16m user equipment.

FIG. 11 is a diagram for another example of a frame structure of a 16m system for supporting a legacy mode according to another embodiment of the present invention.

FIG. 11(a) shows an example for a frame structure of a legacy system.

FIG. 11(b) and FIG. 11(c) relate to a case that a 16m frame is constructed with irregular subframes to support a legacy user equipment. In this case, the irregular subframe indicates a subframe including symbols of which number is not 6.

First of all, a frame shown in FIG. 11(b) includes irregular subframes each of which includes 7 symbols. Unlike FIG. 8 showing that each of the subframes includes 6 symbols only, FIG. 11(b) shows that the subframes 1102b, 1103b and 1104b, each of which includes 7 symbols, are configured in a manner that 3 OFDM symbols included in a 5th subframe 805b in FIG. 8(b) are allocated by being distributed to the subframes 802b, 803b and 804b of the downlink. The frame for the downlink is constructed with 3 subframes 1102b, 1103c and 1104c, each of which includes 7 OFDM symbols, and 1 subframe 1101b including 6 OFDM symbols. And, the frame for the uplink is constructed with 1 subframe 1105b including 3 symbols and 2 subframes 1106b and 1107b each of which includes 6 OFDM symbols. In this case, the 1 subframe 1105b including the 3 symbols is constructed with the remaining 3 OFDM symbols in the 5th subframe 805b shown in FIG. 8(b). A position of the subframe including 6 symbols in downlink is preferably assigned to a start position of a 16m zone within a TDD frame for a legacy support mode of 16m. And, a position of the subframe including 3 symbols in uplink is preferably assigned to a position of a 1st subframe in uplink. Thus, the first one of the UL subframes includes 3 OFDM symbols, which is attributed to the following reason. First of all, in case that a legacy system user equipment and a 16m system user equipment coexist, front subframes (e.g., 1105b, etc.) among subframes allocated to the uplink by TDM in the 16m legacy support mode are used for the legacy mode and rear subframes (e.g., 1106b, 1107b), each of which includes 6 OFDM symbols, are used for the 16m system. Hence, it is able to maintain TTI transmission by type-1 subframe unit of the 16m. This is just one of embodiments of the present invention. And, a position of the subframe including 6 symbols is non-limited by the present invention. In particular, although FIG. 11(*b*) shows that the subframes belonging to the DL frame include 6, 7, 7, and 7 symbols, respectively, they can be sequentially constructed with 7, 6, 7 and 7 symbols, respectively, for example. Yet, a broadcast channel (BCH) including system information is preferably assigned to the position of the subframe including 6 symbols. This is attributed to the following reason. First of all, since a frame structure for supporting the 16m only is constructed with subframes each of which includes 6 symbols only, compatibility with the frame structure for supporting the 16m only should be provided.

FIG. 11(*c*) shows a frame structure, in which 8 subframes are included in a frame. The frame shown in FIG. 11(*c*) is another 16m TDD frame structure for a 16m legacy support mode and includes 4 subframes 1101*c*, 1102*c*, 1107*c* and 1108*c*, each of which includes 6 OFDM symbols), 3 subframes 1103*c*, 1104*c* and 1105*c*, each of which includes 5 OFDM symbols, and 1 subframe 1106*c* including 3 OFDM symbols. Like FIG. 11(*b*), the subframe including 6 symbols in downlink is preferably allocated to a start position of a 16m zone within a TDD frame for a legacy support mode of 16m. This is just one of embodiments of the present invention. And, a position of another subframe including 6 symbols is non-limited by the present invention. Yet, a broadcast channel (BCH) including system information or a super frame header (SFH) is preferably assigned to the position of the subframe including 6 symbols. This is attributed to the following reason. First of all, since a frame structure for supporting the 16m only is constructed with subframes each of which includes 6 symbols only, compatibility with the frame structure for supporting the 16m only should be provided.

First of all, a frame shown in FIG. 11(*d*) includes irregular subframes each of which includes 7 symbols. Unlike FIG. 8 showing that each of the subframes includes 6 symbols only, FIG. 11(*d*) shows that the subframes 1102*d*, 1103*d* and 1104*d*, each of which includes 7 symbols, are configured in a manner that 3 OFDM symbols included in a 5th subframe 805*b* in FIG. 8(*b*) are allocated by being distributed to the subframes 802*b*, 803*b* and 804*b* of the downlink. The frame for the downlink is constructed with 3 subframes 1102*d*, 1103*d* and 1104*d*, each of which includes 7 OFDM symbols, and 1 subframe 1101*d* including 6 OFDM symbols. And, the frame for the uplink is constructed with 1 subframe 1105*d* including 9 symbols and 1 subframe 1106*d* including 6 OFDM symbols. In this case, the 1 subframe 1105*d* including the 9 symbols is constructed in a manner that the remaining 3 OFDM symbols in the 5th subframe 805*b* shown in FIG. 8(*b*) are added to 6 OFDM symbols for the uplink. A position of the subframe including 6 symbols in downlink is preferably assigned to a start position of a 16m zone within a TDD frame for a legacy support mode of 16m. And, a position of the subframe including 9 symbols in uplink is preferably assigned to a position of a 1st subframe in uplink. Thus, the first one of the UL subframes includes 9 OFDM symbols, which is attributed to the following reason. First of all, in case that a legacy system user equipment and a 16m system user equipment coexist, front subframes (e.g., 1105*d*) among subframes allocated to the uplink by TDM in the 16m legacy support mode are used for the legacy mode and rear subframes (e.g., 1106*d*), each of which includes 6 OFDM symbols, are used for the 16m system. Hence, it is able to maintain TTI transmission by type-1 subframe unit of the 16m.

Yet, this is just one of embodiments of the present invention. And, a position of the subframe including 6 symbols is non-limited by the present invention. In particular, although FIG. 11(*b*) shows that the subframes belonging to the DL frame include 6, 7, 7, and 7 symbols, respectively, they can be sequentially constructed with 7, 6, 7 and 7 symbols, respectively, for example. Yet, a broadcast channel (BCH) including system information is preferably assigned to the position of the subframe including 6 symbols. This is attributed to the following reason. First of all, since a frame structure for supporting the 16m only is constructed with subframes each of which includes 6 symbols only, compatibility with the frame structure for supporting the 16m only should be provided.

The 9 OFDM symbols 1105*d* allocated to a first position of the UL frame can be allocated between subframes at other positions configuring 6 OFDM symbols within the allocated UL frame. Yet, considering operations in the legacy mode and operations in the 16m legacy support mode together, the 9 OFDM symbols are preferably allocated to the first position of the UL frame, as proposed by the present invention.

In the UL frame, the 16m user equipment and the legacy user equipment can be multiplexed by TDM or FDM. Preferably, in case that they are multiplexed by the TDM, the first subframe 1105*d* of the uplink is reserved for the legacy user equipment and the second subframe 1106*d* of the uplink is reserved for the 16m user equipment. In case that they are multiplexed by the FDM, the first and second subframes 1105*d* and 1106*d* in the uplink region are used for the legacy user equipment and both of the first and second subframes 1105*d* and 1106*d* in the uplink region for the 16m user equipment are reserved for the 16m user equipment, according to the method proposed by the present invention. Yet, the multiplexing is performed by FDM in a manner that a frequency region used in uplink for the legacy user equipment is differentiated from that used in uplink for the 16m user equipment.

In the case shown in FIG. 11(*d*), a base station notifies a 16m-using user equipment via additional signaling that a 16m legacy support mode having the subframe shown in FIG. 11(*d*) is used. In particular, the base station informs the 16m-using user equipment that the legacy support mode is used. The signaling indicates whether the 16m mode or the 16m legacy support mode is used. This signaling can be carried on system information or a downlink control channel.

FIG. 11(*e*) shows another 16m TDD frame structure for a 16m legacy support mode.

Referring to FIG. 11(*e*), one frame is constructed with 7 subframes.

The frame according to FIG. 11(*e*) is constructed with 3 subframes 1101*e*, 1102*e* and 1107*e*, each of which includes 6 OFDM symbols, 3 subframes 1103*e*, 1104*e* and 1105*e*, each of which includes 5 OFDM symbols, and 1 subframe 1106*e* including 9 OFDM symbols. Like FIG. 11(*b*), a position of the subframe including 6 symbols in downlink is preferably assigned to a start position of a 16m zone in a legacy support mode of 16m. And, a position of the subframe including 9 symbols in uplink is preferably assigned to a position of a 1st subframe with which a UL subframe starts. Thus, the first one of the UL subframes includes 9 OFDM symbols, which is attributed to the following reason. First of all, in case that a legacy system user equipment and a 16m system user equipment coexist, front subframes among subframes allocated to the uplink by TDM in the 16m legacy support mode are used for the legacy mode and rear subframes, each of which includes 6 OFDM symbols, are used for the 16m system. Hence, it is able to maintain TTI transmission by type-1 subframe unit of the 16m.

Yet, this is just one of embodiments of the present invention. And, a position of another subframe including 6 symbols is non-limited by the present invention. In particular, although FIG. 11(*e*) shows that subframes belonging to one frame include 6, 6, 5, 5, 5, 9 and 6 symbols, respectively, they can be sequentially constructed with 6, 5, 6, 5, 5, 6 and 9 symbols, respectively, for example. Yet, a broadcast channel (BCH) including system information or a super frame header (SFH) is preferably assigned to the position of the subframe including 6 symbols. This is to provide compatibility in case that a frame for supporting the 16m only is constructed with subframes each of which includes 6 symbols.

The 9 OFDM symbols 1106e allocated to a first position of the UL frame can be allocated between subframes at other positions configuring 6 OFDM symbols within the allocated UL frame. Yet, considering operations in the legacy mode and operations in the 16m legacy support mode together, the 9 OFDM symbols are preferably allocated to the first position of the UL frame, as proposed by the present invention.

In the UL frame, the 16m user equipment and the legacy user equipment can be multiplexed by TDM or FDM. Preferably, in case that they are multiplexed by the TDM, the first subframe 1106e of the uplink is reserved for the legacy user equipment and the second subframe 1107e of the uplink is reserved for the 16m user equipment. In case that they are multiplexed by the FDM, the first and second subframes 1106e and 1107e in the uplink region are used for the legacy user equipment and both of the first and second subframes 1106e and 1107e in the uplink region for the 16m user equipment are reserved for the 16m user equipment, according to the method proposed by the present invention. Yet, the multiplexing is performed by FDM in a manner that a frequency region used in uplink for the legacy user equipment is differentiated from that used in uplink for the 16m user equipment.

The example shown in FIG. 11(e) is applicable to a case that a legacy system having 8.75 MHz transmission bandwidth and a 16m system are simultaneously operated. In this case, a base station notifies a 16m-using user equipment via additional signaling that a legacy support mode having the subframe shown in FIG. 11(e) is used. In particular, the base station informs the 16m-using user equipment that the 16m legacy support mode is used. The signaling indicates whether the 16m mode is supported only or both of the 16m mode and the 16m legacy mode are supported. This signaling can be carried on system information or a downlink control channel.

In the frame structure of the 16m in the 16m legacy support mode, 15 OFDM symbols, as shown in FIG. 11(b) to FIG. 11(d), are fixedly allocated for the uplink. Yet, this is just exemplary. The number of OFDM symbols allocated to the uplink is non-limited by the present invention.

A frame configured to support the 16m only, as shown in FIG. 10, includes 7 subframes. Each of the 7 subframes includes 6 OFDM symbols. According to this method, it is able to succeed to a 6-unit subframe structure in a basic frame structure. And, it is able to configure a frame structure including subframes of one type only.

Figure 12:
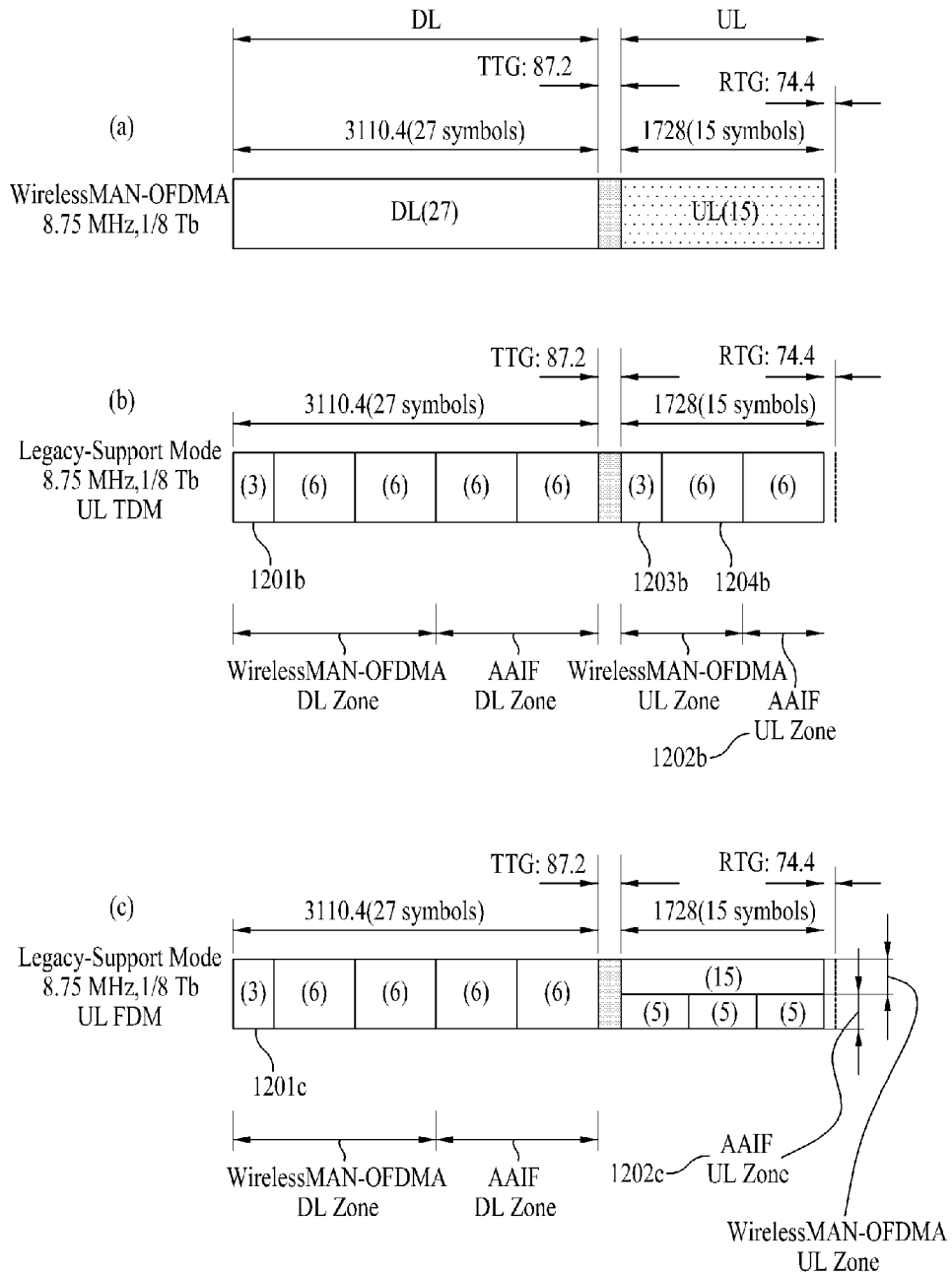
FIG. 12 is a diagram of a new frame structure according to the present invention, in which a frame structure supporting a legacy system having 27 downlink OFDM symbols and 15 uplink OFDM symbols is shown.

FIG. 12 is a diagram of a new frame structure according to the present invention, in which a frame structure supporting a legacy system having 27 downlink OFDM symbols and 15 uplink OFDM symbols is shown. FIG. 12(a) shows an example of a frame structure of a legacy system. FIG. 12(b) shows an example of a TDD structure using TDM in uplink. And, FIG. 12(c) shows an example of a TDD structure using FDM in uplink. In the drawings, 'AAIF' indicates a frame of 16m and 'Wireless MAN-OFDMA' indicates a legacy system.

In each of the frame structures shown in FIG. 12(b) and FIG. 12(c), a 1st DL subframe 1201b/1201c includes 3 OFDM symbols and is usable as a DL zone for a legacy system only. Every subframe for the 16m within a 16m DL zone is a type-1 subframe. And, the number of symbols within the DL zone for the legacy mode is set to '3+6* (FRAME_OFFSET-1)'.

In FIG. 12(b), every subframe within a 16m UL zone 1202b is a type-1 subframe. In FIG. 12(c), every subframe within a 16m UL zone 1202c is a type-3 subframe.

In FIG. 12 (b), 9 uplink OFDMA symbols 1203b and 1204b are used for a legacy mode and the remaining 6 uplink OFDMA symbols 1202b are used for a 16m only. Alternatively, 3 uplink OFDMA symbols 1203b are usable for the legacy mode only and the remaining 12 uplink OFDMA symbols 1202b and 1204b are usable for the 16m. In both cases, every subframe for the 16m is the type-1 subframe.

FIG. 12(c) shows that each subframe in the zone 1202c for the 16m includes the type-3 subframe. Alternatively, the zone 1202c can include 1 subframe including 9 OFDMA symbols and 1 subframe including 6 OFDMA symbols.

In the following description, a frame structure for a 16m legacy support mode of 'CP=1/16 Tb' is explained.

Figure 13:
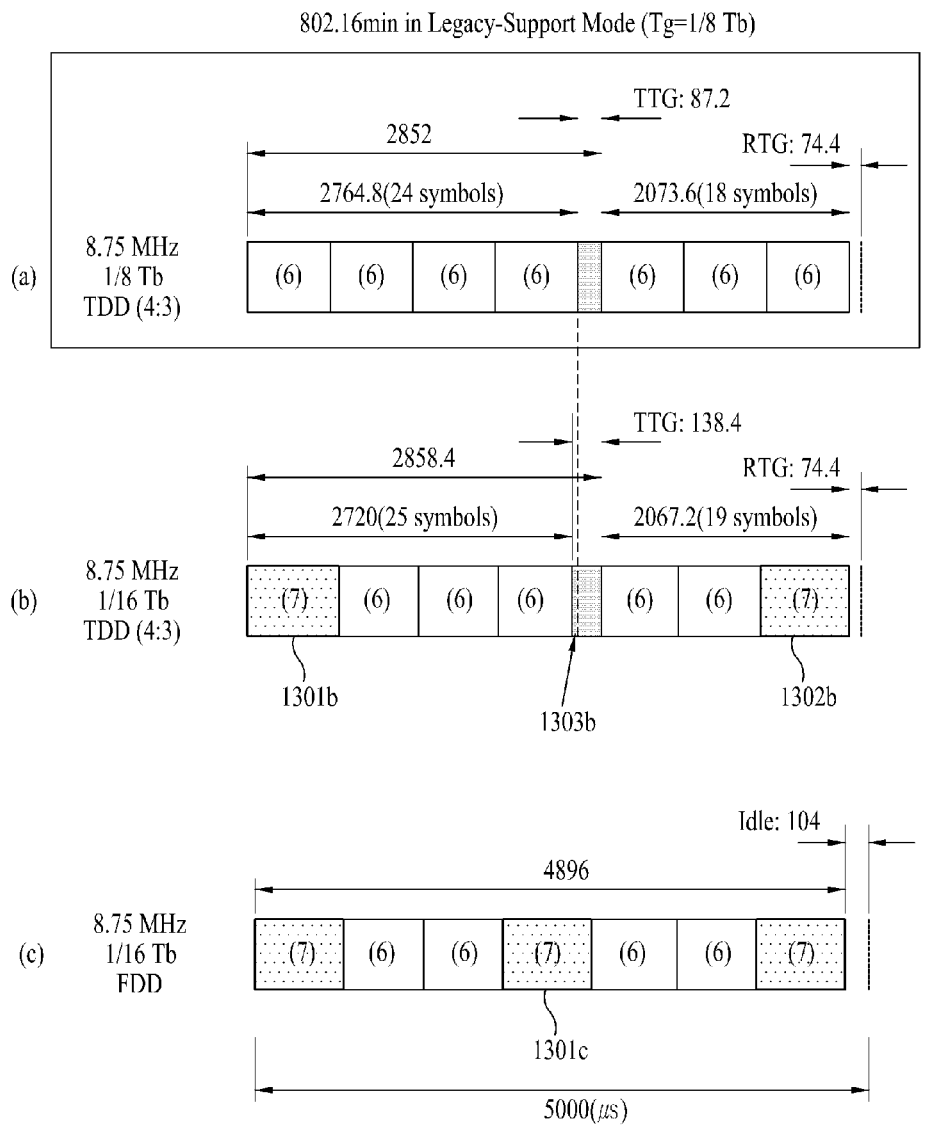
FIG. 13 is a diagram for structures of TDD and FDD frames for 16m legacy support mode if CP=1/16 Tb.

FIG. 13 is a diagram for structures of TDD and FDD frames for 16m legacy support mode if CP=1/16 Tb. FIG. 13(a) shows a frame structure for a 16m legacy support mode if CP=1/8 Tb. FIG. 13(b) shows a TDD frame structure for a 16m legacy support mode if CP=1/16 Tb. And, FIG. 13(c) shows an FDD frame structure for a 16m legacy support mode if CP=1/16 Tb.

First of all, if a switching point of a frame structure of 'CP=1/16 Tb' is fitted to a DL-UL switching point in a legacy system or a 16m system of 'CP=1/8 Tb', it becomes an important reference for designing a frame structure of 'CP=1/16 Tb'. This is because interference between DL and UL may occur if the switching point is not matched. Moreover, a new frame structure having a bandwidth of 8.75 MHz should have commonality to a frame structure having a bandwidth of 5 Hz, 10 MHz or 20 MHz. For nominal channel bandwidth of 5 Hz, 10 MHz or 20 MHz, each FDD frame has 5 type-1 subframes and 3 type-2 subframes [FIG. 13(c)] and each TDD frame should have 6 type-1 subframes and 2 type-2 subframes [FIG. 13(b)]. According to the present invention, in case of TDD, two type-2 subframes 1301b and 1302b should be separately located in UL and DL regions, respectively. And, a last OFDMA symbol 1303b of another type-2 subframe is an idle symbol. This configuration is identically applied to the channel bandwidths 5 Hz, 10 MHz and 20 MHz. If a DL:UL ratio is 2:5, 3:4, 5:2 or 6:1, a 16m legacy support mode of 'CP=1/16 Tb' can coexist with a 16m legacy support mode of 'CP=1/8 Tb'. In the FDD frame, an additional type-2 subframe 1301c exists. In FIG. 13(c), the additional type-2 subframe is located at a 4th subframe, which is non-limited by the present invention.

Figure 14:
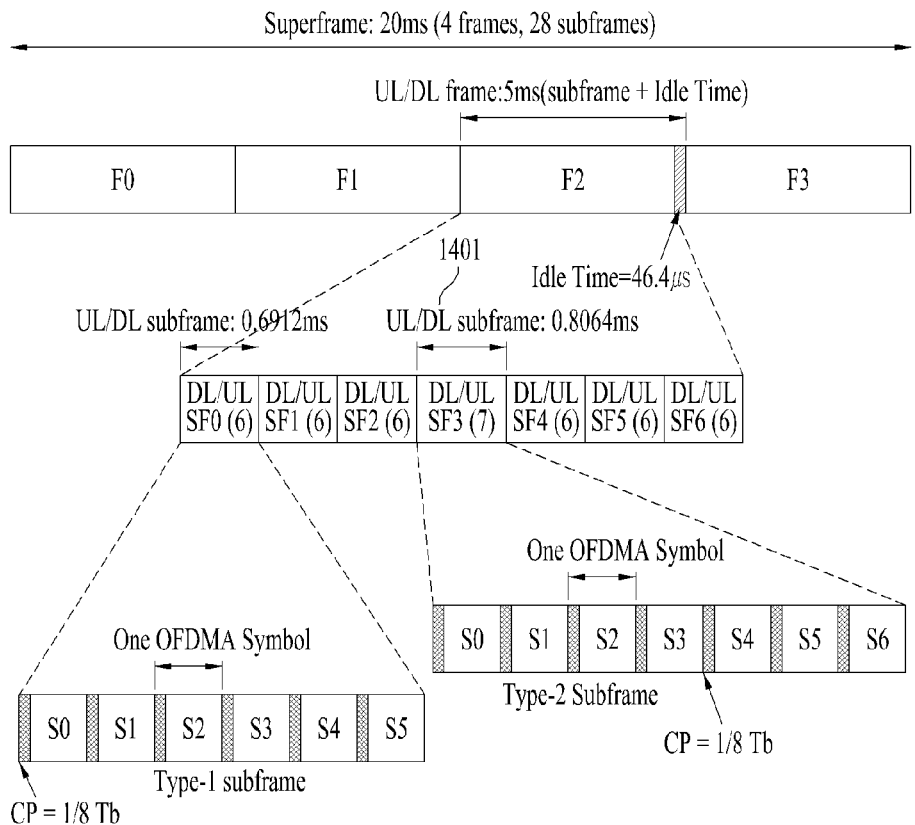
FIG. 14 is a diagram for an example of an FDD frame structure for 16m with a bandwidth of 8.75 MHz if CP=1/8 Tb according to the present invention.

FIG. 14 is a diagram for an example of an FDD frame structure for 16m with a bandwidth of 8.75 MHz if CP=1/8 Tb according to the present invention.

Referring to FIG. 14, a 4th subframe within each frame including 7 subframes is a type-2 subframe having 7 OFDM symbols. If a 16m system supports a legacy system having a bandwidth of 8.75 MHz, every subframe within a 16m downlink may include a type-1 subframe. The number of symbols within a legacy DL zone is set to '6 FRAME_OFFSET'. If a 16m system has a bandwidth of 8.75 MHz and supports a legacy system having 17 uplink OFDM symbols, every subframe within a 16m downlink may include a type-1 subframe. The number of symbols within a legacy DL zone is set to '3+6*(FRAME_OFFSET-1)'. If a subframe has a bandwidth of 5 Hz, 8.75 MHz, 10 MHz or 20 MHz and includes 12 or 18 uplink OFDM symbols, every UL subframe may include a type-1 subframe. If a subframe has a bandwidth of 8.75 MHz and includes 15 uplink OFDM symbols, every subframe may include a type-3 subframe. If a subframe has a bandwidth of 5 Hz, 10 MHz or 20 MHz and includes 12 or 18 uplink OFDM symbols, every UL subframe may include a type-1 subframe.

Figure 15:
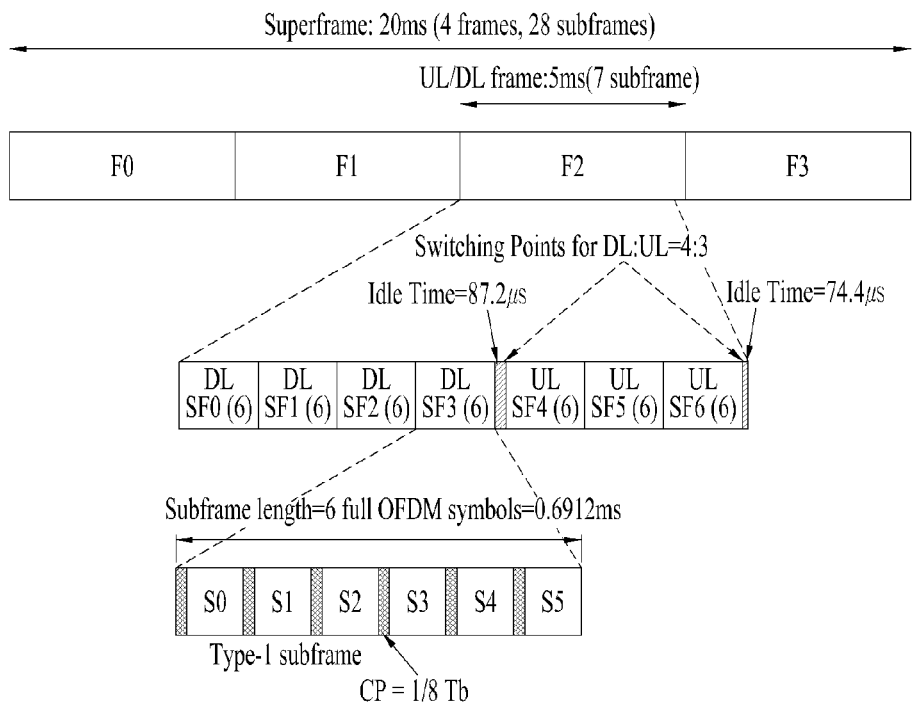
FIG. 15 is a diagram for an examples of a TTT frame structure for 16m with a bandwidth of 8.75 MHz if 'CP=1/8 Tb' and 'DL:UL=4:3' according to the present invention.

FIG. 15 is a diagram for an examples of a TTT frame structure for 16m with a bandwidth of 8.75 MHz if 'CP=1/8 Tb' and 'DL:UL=4:3' according to the present invention.

Figure 16:
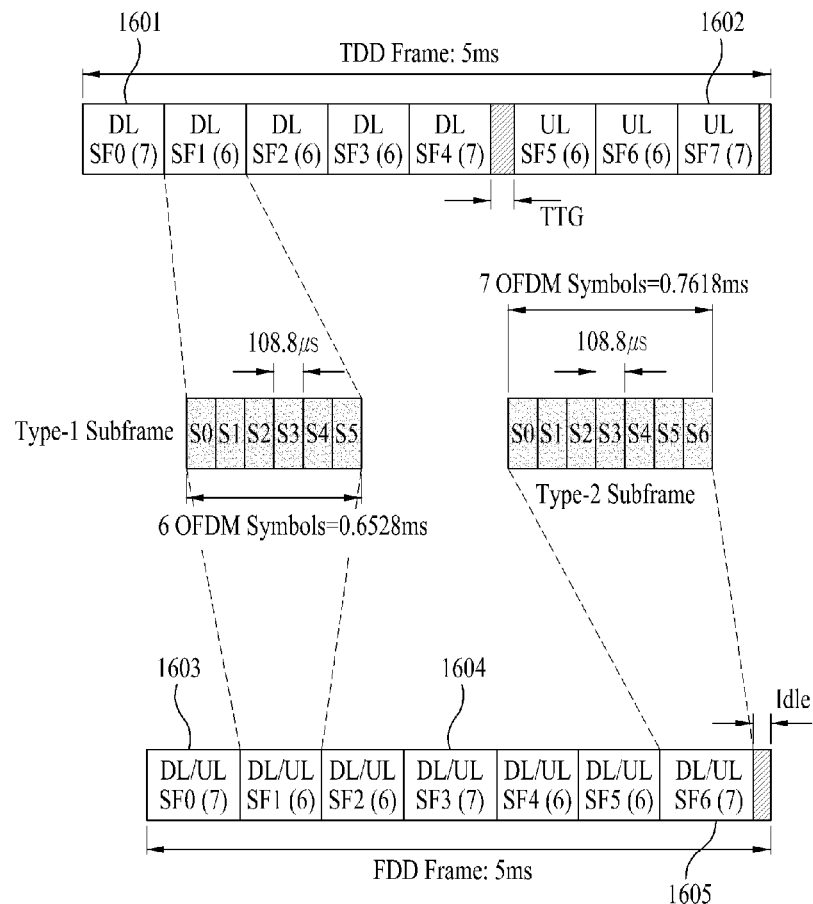
FIG. 16 is a diagram for an example of TDD and FDD frame structures with 'DL:UL=4:3', 'CP=1/16 Tb', and 'channel bandwidth of 8.75 MHz' according to the present invention.

FIG. 16 is a diagram for an example of TDD and FDD frame structures with 'DL:UL=4:3', 'CP=1/16 Tb', and 'Channel bandwidth of 8.75 MHz' according to the present invention.

In this case, a duration time of OFDMA symbol is 108.8 μs, CP is equal to 1/16 Tb, a length of a type-1 subframe is 0.6528 ms, and a length of a type-2 subframe is 0.7616 ms. For a channel bandwidth of 8.75 MHz, one FDD frame has 4 type-1 subframes and 3 type-2 subframes and one TDD frames has 5 type-1 subframes and 2 type-2 subframes. In the TDD frame, first and last subframes 1601 and 1602 are type-2 subframes. In the FDD frame, first, fourth and last subframes 1603, 1604 and 1605 are type-2 subframes.

A 16m user equipment receives a SCH when it initially enters a network [initial entry]. The 16m user equipment fits frame synchronization to the received SCH and then obtains information on a system from a BCH. Therefore, the BCH contains information indicating whether the user equipment currently operates in a mode supporting a 16m only (hereinafter named '16m-only mode') or a 16m legacy support mode. Based on this information, a base station is able to use a different frame structure according to either the 16m legacy support mode or the 16m-only mode. In case of the 16m-only mode, a type-1 subframe including 6 symbols is usable. In case of the legacy support mode, it is able to use a frame structure of the 16m legacy support mode proposed by the present invention, i.e., the frame structure defined in one of FIG. 6, FIG. 10, FIG. 11 and FIG. 12. After the user equipment has checked the information contained in the BCH, if it operates in the 16m legacy support mode, a start position of a 16m zone is set according to frame offset information contained in the BCH. In this case, in case of the 16m legacy support mode, a ratio of DL to UL may vary according to whether a current frame structure includes 7 subframes shown in FIG. 11(b) or 8 subframes shown in FIG. 11(c). In particular, according to the number of subframes configuring a frame, the DL-to-UL ratio can vary. Hence, it is able to represent the DL-to-UL ratio according to the number of subframes constructing a frame structure using N-bit field (where N=1, 2, 3, 4, . . . . It is able to represent a correspondence relation between the N-bit field and the DL-to-UL ratio as a table. The N-bit field is transmitted by being contained in system information or BCH. And, it is able to know the DL-to-UL ratio using the table.

In case that one frame is constructed with 7 subframes, a DL-to-UL ratio can be set to 5:2, 4:3, 3:4, 2:5 or the like. In case that one frame is constructed with 8 subframes, a DL-to-UL ratio can be set to 6:2, 5:3, 3:5 or the like.

The DL-to-UL ratios proposed according to the present embodiment are just exemplary and other DL-to-UL ratios are possible as well as the present DL-to-UL ratios.

Table 3 shows an example that a DL-to-UL ratio is represented as 2 bits if a frame is constructed with 7 subframes.

TABLE 3

| Bit information | DL-to-UL ratio |
| --- | --- |
| 00 | 5:2 |
| 01 | 4:3 |

TABLE 3-continued

| Bit information | DL-to-UL ratio |
| --- | --- |
| 10 | 3:4 |
| 11 | 2:5 |

Table 4 shows an example that a DL-to-UL ratio is represented as 2 bits if a frame is constructed with 8 subframes.

TABLE 4

| Bit information | DL-to-UL ratio |
| --- | --- |
| 00 | 6:2 |
| 01 | 5:3 |
| 10 | 4:4 |
| 11 | 2:6 |

When a 16m user equipment supporting a legacy mode receives a service from a legacy base station, a frame structure for a legacy system is used. The 16m user equipment supporting the legacy mode is able to hand over into a 16m base station from the legacy base station. In doing so, the 16m user equipment follows a legacy handover procedure supported by the 16m base station. Therefore, the 16m user equipment keeps operating in the legacy mode within a cell served by the 16m base station. The 16m base station informs the 16mm user equipment operating in the legacy mode via a frame control header 9FCH) that the serving of the 16m base station is in progress. Moreover, the 16m user equipment puts an indication, which indicates that it is the 16m user equipment, into a handover ranging channel and then transmits the handover ranging channel. Afterward, the 16m base station recognizes from the indication carried on the ranging channel that the user equipment having transmitted the ranging channel is the 16m user equipment. Subsequently, the 16m base station informs the 16m user equipment of a location of a 16m zone in response to the ranging channel.

If so, the 16m user equipment is able to receive information bit about a DL-to-UL ratio via BCH in the 16m zone. The 16m user equipment is able to recognize a value of the DL-to-UL ratio proposed by the scheme shown in Table 3 or Table 4. Afterward, the 16m user equipment and the base station are able to use the 16m-only frame structure. According to one embodiment, communication can be performed between a 16m user equipment and a base station using the structure shown in FIG. 9, which uses a frame including 7 subframes each of which includes 6 OFDM symbols.

According to the present invention, when a prescribed TDD system and a system evolved from the prescribed TDD system coexist, it is able to eliminate the interference between uplink and downlink. The prescribed TDD system can include a 16e system and the evolved system can include a 16m system. According to the present invention, deployment of a new system is enabled without changing UL/DL configuration of a legacy system.

First Embodiment

One embodiment of the present invention can include the step that a user equipment of such a wireless communication system as a 16m system transmits a signal. The user equipment is multiplexed with a second user equipment, which supports a legacy system (e.g., 16e system) for the wireless communication system, for uplink by FDM. In this case, the uplink of the legacy system includes 15 OFDMA symbols. The signal is transmitted via a UL frame including 15

OFDMA symbols. And, the UL frame includes a first UL subframe including 9 OFDMA symbols and a second UL subframe including 6 OFDMA symbols. Preferably, a bandwidth of the wireless communication system is 8.75 MHz, the wireless communication system uses TDD (time division duplex) scheme, and a ratio G of a useful symbol duration time for a cyclic prefix (CP) duration of the OFDMA symbol is 1/8. The present embodiment can further include the step that the user equipment receives signaling indicating that the UL frame structure is used from a base station.

Second Embodiment

Another embodiment of the present invention can include the step that a user equipment of such a wireless communication system as a 16m system transmits a signal via a UL frame including 15 OFDMA symbols. The user equipment is multiplexed with a second user equipment, which supports a legacy system (e.g., 16e system) for the wireless communication system only, for uplink by TDM. In this case, the uplink of the legacy system includes 15 OFDMA symbols.

The signal is transmitted via a UL subframe including 6 OFDMA symbols as a UL subframe included in the UL frame. In this case, the UL frame includes two UL frames each of which includes the 6 OFDMA symbols and 3 OFDMA symbols. And, the signal can be transmitted via the two UL frames only. In this case, the user equipment is multiplexed with a second user equipment supporting a legacy system for the wireless communication system only by TDM for the uplink. And, the 3 OFDMA symbols are usable for a UL signal transmitted by the second user equipment.

Alternatively, the UL frame includes 1 UL frame including the 6 OFDMA symbols and 9 OFDMA symbols. And, the signal can be transmitted via the 1 UL frame only. In this case, the user equipment is multiplexed with a second user equipment supporting a legacy system for the wireless communication system only by TDM for the uplink. And, the 6 OFDMA symbols are usable for a UL signal transmitted by the second user equipment.

A bandwidth of the wireless communication system is 8.75 MHz, the wireless communication system uses TDD (time division duplex) scheme, and a ratio G of a useful symbol duration time for a cyclic prefix (CP) duration of the OFDMA symbol is 1/8. The present embodiment can further include the step that the user equipment receives signaling indicating that the UL frame structure is used from a base station.

Third Embodiment

Another embodiment of the present invention can include the step that a base station of such a wireless communication system as a 16m system receives a signal via a UL frame including 15 OFDMA symbols. In this case, the UL frame includes a first UL subframe including 9 OFDMA symbols and a second UL subframe including 6 OFDMA symbols. In this case, a first user equipment transmitting the signal can be multiplexed with a second user equipment, which supports a legacy system for the wireless communication system only, for uplink by FDM.

The first user equipment is multiplexed with a second user equipment, which supports a legacy system (e.g., 16e system) for the wireless communication system only, for uplink by FDM. In this case, the uplink in the legacy system includes 15 OFDMA symbols. A bandwidth of the wireless communication system is 8.75 MHz, the wireless communication system uses TDD (time division duplex) scheme, and a ratio G of a useful symbol duration time for a cyclic prefix (CP) duration of the OFDMA symbol is 1/8. The present embodiment can further include the step that the base station transmits signaling indicating that the UL frame structure is used to the user equipment.

Fourth Embodiment

Another embodiment of the present invention can include the step that a base station of such a wireless communication system as a 16m system receives a signal via a UL frame including 15 OFDMA symbols. And, the signal is transmitted via a UL subframe including 6 OFDMA symbols only as a UL subframe included in the UL frame.

In this case, the user equipment transmitting the signal is multiplexed with a second user equipment, which supports a legacy system for the wireless communication system only, for uplink by TDM. In this case, the UL frame includes two UL frames, each of which includes the 6 OFDMA symbols, and 3 OFDMA symbols. And, the signal can be transmitted via the two UL frames only. And, the 9 OFDMA symbols are used for a UL signal transmitted by the second user equipment.

Alternatively, the user equipment is multiplexed with a second user equipment supporting a legacy system for the wireless communication system only by TDM for the uplink. And, the UL frame includes 1 UL frame including the 6 OFDMA symbols and 9 OFDMA symbols. The signal is transmitted via the 1 UL frame only. And, the 3 OFDMA symbols are usable for a UL signal transmitted by the second user equipment.

The user equipment is multiplexed with a second user equipment supporting a legacy system (i.e., 16e system) for the wireless communication system only by TDM for the uplink. In this case, the uplink in the legacy system includes 15 OFDMA symbols. A bandwidth of the wireless communication system is 8.75 MHz, the wireless communication system uses TDD (time division duplex) scheme, and a ratio G of a useful symbol duration time for a cyclic prefix (CP) duration of the OFDMA symbol is 1/8. The present embodiment can further include the step that the base station transmits signaling indicating that the UL frame structure is used to the user equipment.

Figure 17:
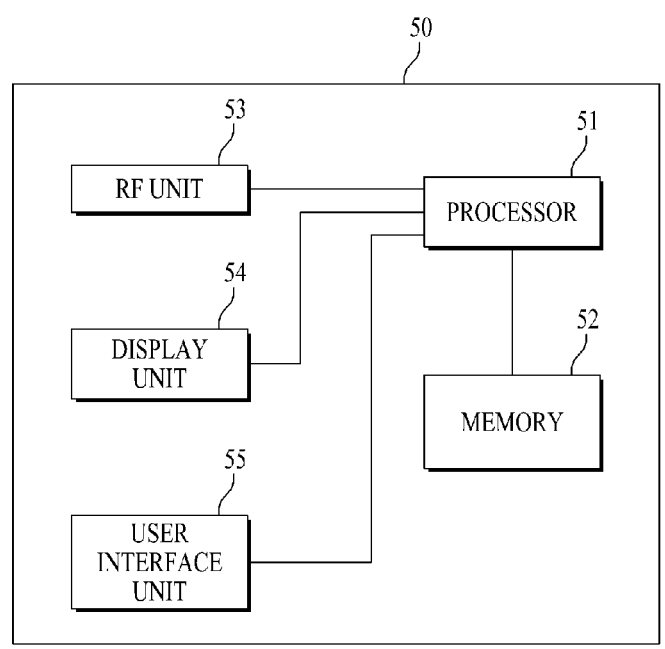
FIG. 17 is a diagram for components of a user equipment or a base station used for the present invention.

FIG. 17 is a diagram for components of a user equipment or a base station used for the present invention.

Referring to FIG. 17, a device 50 can include a user equipment or base station used by the present invention. The device 50 is usable to implement the descriptions with reference to FIGS. 9 to 16. In particular, the above first to fourth embodiments can be executed by the device 50.

The device 50 includes a processor 51, a memory 52, an RF (radio frequency) unit 53, a display unit 604 and a user interface unit 605. Layers of a radio interface protocol is performed within the processor 51. The processor 51 provides a control plane and a user plane. A function of each of the layers can be implemented within the processor 51. And, the processor 51 can include a contention resolution timer. The memory 52 is connected to the processor 51. And, an operating system, applications and general files are stored in the memory 52. If the device 50 is a user equipment, the display unit 54 is able to display various kinds of informations. And, the display unit 54 can be implemented using a well-known LCD (liquid crystal display), an OLED (organic light emitting diode) display and the like. The user interface unit 55 can be configured by being combined with such a well-known user interface as a keypad, a touchscreen and the like. The RF unit 53 is connected to the processor 51. The RF unit 53 is then able to transmit or receive a radio signal.

If the device 50 is a user equipment, the signal transmitting step of the first/second embodiment can be performed by the processor 51 via the RF unit 53.

If the device 50 is a base station, the signal receiving step of the third/fourth embodiment can be performed by the processor 51 via the RF unit 53.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

INDUSTRIAL APPLICABILITY

Accordingly, the present invention is applicable to a wireless mobile communication system that uses orthogonal frequency multiplexing.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of receiving and transmitting, by a user equipment, signals using a transmission band of 8.75 MHz and a cyclic prefix of $1/8 \cdot T_b$, where $T_b$ is a useful symbol time, in an advanced wireless mobile communication system, the method comprising:

receiving, by the user equipment, a broadcast channel containing information on a frame_offset;

receiving, by the user equipment, a first downlink signal in a downlink time zone when the user equipment is a first user equipment operating in a legacy system mode according to a legacy wireless mobile communication system and receiving a second downlink signal in the downlink time zone when the user equipment is a second user equipment operating in an advanced system mode according to the advanced wireless mobile communication system;

transmitting, by the user equipment, a first uplink signal in an uplink time zone when the user equipment is the first user equipment and transmitting a second uplink signal in the uplink time zone when the user equipment is the second user equipment;

wherein the downlink time zone is divided into a first downlink time zone for the legacy wireless mobile communication system and a second downlink time zone for the advanced wireless mobile communication system in a time domain, and wherein the transmission band in the uplink time zone is divided into a first uplink frequency zone for the legacy wireless mobile communication system and a second uplink frequency zone for the advanced wireless mobile communication system in a frequency domain, and wherein the uplink time zone spans 15 OFDM symbols, and the number of OFDM symbols in the first downlink time zone is "3+6*(frame_offset−1)".

2. The method of claim 1, further comprising receiving information on a structure of the uplink time zone from a base station.

3. The method of claim 1, wherein: the advanced wireless mobile communication system uses a frame which has a length of 5 ms and includes a plurality of subframes, each of which is a type-1 subframe including 6 OFDM (orthogonal frequency division multiple access) symbols, a type-2 subframe including 7 OFDM symbols, a type-3 subframe including 5 OFDM symbols, or a type-4 subframe including 9 OFDM symbols; and the 15 OFDM symbols that the uplink time zone spans are divided into three type-3 subframes, or divided into one type-1 subframe and one type-4 subframe within the second uplink frequency zone.

4. The method of claim 1, wherein:

the advanced wireless mobile communication system uses a frame which has a length of 5 ms and includes a plurality of subframes, each of which is a type-1 subframe including 6 OFDM (orthogonal frequency division multiple access) symbols, a type-2 subframe including 7 OFDM symbols, a type-3 subframe including 5 OFDM symbols, or a type-4 subframe including 9 OFDM symbols; and each subframe within the second downlink time zone is the type-1 subframe.

5. A method of transmitting and receiving, by a base station, signals using a transmission band of 8.75 MHz and a cyclic prefix of $1/8 \cdot T_b$, where $T_b$ is a useful symbol time, in an advanced wireless mobile communication system the method comprising:

transmitting, by the base station, a broadcast channel containing information on a frame offset;

transmitting, by the base station, a first downlink signal for a legacy wireless mobile communication system and a second downlink signal for the advanced wireless mobile communication system in a downlink time zone; and receiving, by the base station, a first uplink signal transmitted by a first user equipment operating in a legacy system mode according to the legacy wireless mobile communication system and a second uplink signal transmitted by a second user equipment operating in an advanced system mode according to the advanced wireless mobile communication system in an uplink time zone, wherein the downlink time zone is divided into a first downlink time zone for the legacy wireless mobile communication system and a second downlink time zone for the advanced wireless mobile communication system in a time domain, and wherein the transmission band in the uplink time zone is divided into a first uplink frequency zone for the legacy wireless mobile communication system and a second uplink frequency zone for the advanced wireless mobile communication system in a frequency domain, and wherein the uplink time zone spans 15 OFDM symbols, and the number of OFDM symbols in the first downlink time zone is "3+6*(frame offset−1)".

6. The method of claim 5, further comprising:
transmitting, by the base station, information on a structure of the uplink time zone.

7. The method of claim 5, wherein:
the advanced wireless mobile communication system uses a frame which has a length of 5 ms and includes a plurality of subframes, each of which is a type-1 subframe including 6 OFDM (orthogonal frequency division multiple access) symbols, a type-2 subframe including 7 OFDM symbols, a type-3 subframe including 5 OFDM symbols, or a type-4 subframe including 9 OFDM symbols; and
the 15 OFDM symbols that the uplink time zone spans are divided into one type-3 subframes or divided one type-1 subframe and one type-4 subframe within the second uplink frequency zone.

8. The method of claim 5, wherein:
the advanced wireless mobile communication system uses a frame which has a length of 5 ms and includes a plurality of subframes, each of which is a type-1 subframe including 6 OFDM (orthogonal frequency division multiple access) symbols, a type-2 subframe including 7 OFDM symbols, a type-3 subframe including 5 OFDM symbols, or a type-4 subframe including 9 OFDM symbols; and
each subframe within the second downlink time zone is the type-1 subframe.

* * * * *